(12) United States Patent
Mesuda

(10) Patent No.: US 10,651,475 B2
(45) Date of Patent: May 12, 2020

(54) ELECTRODE PLATE MANUFACTURING APPARATUS, MANUFACTURING METHOD OF POSITIVE PLATE, AND MANUFACTURING METHOD OF NEGATIVE PLATE

(71) Applicant: TOYOTA JIDOSHA KABUSHIKI KAISHA, Toyota-shi, Aichi-ken (JP)

(72) Inventor: Tomoya Mesuda, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 185 days.

(21) Appl. No.: 15/793,080

(22) Filed: Oct. 25, 2017

(65) Prior Publication Data

US 2018/0138515 A1 May 17, 2018

(30) Foreign Application Priority Data

Nov. 16, 2016 (JP) ................................ 2016-223298

(51) Int. Cl.
*H01M 4/06* (2006.01)
*H01M 4/1393* (2010.01)
(Continued)

(52) U.S. Cl.
CPC ......... *H01M 4/667* (2013.01); *H01M 4/0404* (2013.01); *H01M 4/0435* (2013.01);
(Continued)

(58) Field of Classification Search
CPC ......... H01M 2004/021; H01M 4/0404; H01M 4/0435; H01M 4/139; H01M 4/1393;
(Continued)

(56) References Cited

U.S. PATENT DOCUMENTS 6,065,319 A 5/2000 Mikami et al.
10,236,498 B2* 3/2019 Nakano ............... H01M 4/0435
(Continued)

FOREIGN PATENT DOCUMENTS

JP 10-137821 A 5/1998
JP 2000-331674 A 11/2000
(Continued)

OTHER PUBLICATIONS

Office Action Issued to U.S. Appl. No. 15/226,357 dated Apr. 4, 2018.
(Continued)

*Primary Examiner* — Adam A Arciero
(74) *Attorney, Agent, or Firm* — Sughrue Mion, PLLC

(57) ABSTRACT

An electrode plate manufacturing apparatus includes: a first roll; a second roll that consolidates a particle aggregate and forms an undried active material film; and a third roll that transcribes the undried active material film on the second roll onto a current collector foil. A circumferential velocity A of the first roll, a circumferential velocity B of the second roll, a conveyance velocity C of the current collector foil, a contact angle $\alpha$ of the first roll, a contact angle $\beta$ of the second roll, and a contact angle $\gamma$ of the current collector foil satisfy conditions (i) $\beta-\alpha \geq -1.6 \times B/A+40$ where $\beta-\alpha>0$ and $B/A \geq 1$ and (ii) $\gamma-\beta \geq -1.6 \times C/B+40$ where $\gamma-\beta>0$ and $C/B \geq 1$.

9 Claims, 8 Drawing Sheets

(51) Int. Cl.
 *H01M 4/38* (2006.01)
 *H01M 4/64* (2006.01)
 *H01M 4/1395* (2010.01)
 *H01M 4/58* (2010.01)
 *H01M 4/48* (2010.01)
 *H01M 4/66* (2006.01)
 *H01M 4/04* (2006.01)
 *H01M 4/139* (2010.01)
 *H01M 4/02* (2006.01)

(52) U.S. Cl.
 CPC ....... *H01M 4/1393* (2013.01); *H01M 4/1395* (2013.01); *H01M 4/382* (2013.01); *H01M 4/48* (2013.01); *H01M 4/58* (2013.01); *H01M 4/64* (2013.01); *H01M 4/661* (2013.01); *H01M 4/139* (2013.01); *H01M 2004/021* (2013.01)

(58) Field of Classification Search
 CPC ...... H01M 4/1395; H01M 4/382; H01M 4/48; H01M 4/58; H01M 4/64; H01M 4/661; H01M 4/667
 See application file for complete search history.

(56) References Cited

U.S. PATENT DOCUMENTS

| | | | |
|---|---|---|---|
| 2005/0112435 A1* | 5/2005 | Kobayashi | C25B 9/10 429/492 |
| 2008/0176142 A1* | 7/2008 | Inagaki | B60L 50/64 429/330 |
| 2011/0052954 A1* | 3/2011 | Fujiwara | H01M 4/0404 429/94 |
| 2015/0238994 A1* | 8/2015 | Mikami | B05C 1/0813 118/258 |
| 2016/0082467 A1* | 3/2016 | Mikami | B05C 1/0834 429/209 |
| 2017/0040591 A1 | 2/2017 | Nakano | |

FOREIGN PATENT DOCUMENTS

| | | |
|---|---|---|
| JP | 2001-43848 A | 2/2001 |
| JP | 2013-17962 A | 1/2013 |
| JP | 2013-215688 A | 10/2013 |
| JP | 2014-133194 A | 7/2014 |
| JP | 2014-191880 A | 10/2014 |
| JP | 2015-178093 A | 10/2015 |
| JP | 2017-091987 A | 5/2017 |

OTHER PUBLICATIONS

Final Office Action Issued to U.S. Appl. No. 15/226,357 dated Aug. 2, 2018.
Notice of Allowance Issued to U.S. Appl. No. 15/226,357 dated Nov. 21, 2018.
U.S. Appl. No. 15/226,357, filed Aug. 2, 2016.

* cited by examiner

ELECTRODE PLATE MANUFACTURING APPARATUS, MANUFACTURING METHOD OF POSITIVE PLATE, AND MANUFACTURING METHOD OF NEGATIVE PLATE

INCORPORATION BY REFERENCE

The disclosure of Japanese Patent Application No. 2016-223298 filed on Nov. 16, 2016 including the specification, drawings and abstract is incorporated herein by reference in its entirety.

BACKGROUND

1. Technical Field

The disclosure relates to an electrode plate manufacturing apparatus, a manufacturing method of a positive plate, and a manufacturing method of a negative plate for consolidating a particle aggregate that contains active material particles, a binding agent, a solvent, and granulated wet particles between rolls and further transcribing an undried active material film onto current collector foil between the rolls when an electrode plate is manufactured.

2. Description of Related Art

As an electrode plate (a positive plate or a negative plate) used for a battery, an electrode plate in which an active material layer including active material particles, a binding agent, and the like is formed on current collector foil has been known. Such an electrode plate is formed by a method as disclosed in Japanese Patent Application Publication No. 2015-178093 (JP 2015-178093 A), for example. More specifically, negative active material particles, the binding agent, a thickener, and a solvent are first stirred by a kneader to produce a negative mixture coating material, volume moisture content of which is 50%. In addition, a roll press that includes: a first roll; a second roll that is arranged in parallel with this first roll via a gap; and a third roll that is arranged in parallel with this second roll via a gap is prepared. Then, the negative mixture coating material described above passes between the first roll and the second roll to form a coating film on the second roll. Next, the coating film, which is held on the second roll between the second roll and the third roll, is transcribed onto negative current collector foil that is conveyed between the second roll and the third roll. Thereafter, the coating film on this negative current collector foil is dried to form a negative active material layer.

Furthermore, in this JP 2015-178093 A, a contact angle $\alpha$ between a roll surface of the first roll and the solvent (specifically, water) used for the negative mixture coating material is set to be equal to or larger than a contact angle $\beta$ between a roll surface of the second roll and water ($\alpha \geq \beta$), and the contact angle $\beta$ between the roll surface of the second roll and water is set to be larger than a contact angle $\gamma$ between a foil surface of the negative current collector foil and water ($\beta > \gamma$). It is described that, with such a relationship ($\alpha \geq \beta > \gamma$), the uniform coating film can be formed on the negative current collector foil.

SUMMARY

However, in the manufacturing method disclosed in JP 2015-178093 A described above, in the cases where a particle aggregate that contains granulated wet particles and has a high solid fraction (for example, the solid fraction exceeds 65 wt %) is used instead of the negative mixture coating material described above, and the particle aggregate is consolidated between the first roll and the second roll to form an undried active material film on the second roll, defects such as lack of hiding (a hole-shaped defect portion in the undried active material film) and a streak (a streaky defect portion along an advancing direction in the undried active material film) possibly occur.

In addition, when the undried active material film, which is held on the second roll, is transcribed onto the current collector foil between the second roll and the third roll, transcription failure possibly occurs, and similarly, the defects such as the lack of hiding and the streak possibly occur to the undried active material film. Accordingly, in the case where the defects such as the lack of hiding and the streak have already occurred to the undried active material film during formation of the undried active material film on the second roll, the defects that occur to the undried active material film formed on the current collector foil possibly worsen. Meanwhile, even in the case where the uniform undried active material film is formed during the formation of the undried active material film on the second roll, the defects such as the lack of hiding and the streak possibly occur to the undried active material film formed on the current collector foil. When the undried active material film formed on the current collector foil is non-uniform as described above, the active material layer that is formed after drying the undried active material film also becomes the non-uniform active material layer.

The disclosure provides an electrode plate manufacturing apparatus, a manufacturing method of a positive plate, and a manufacturing method of a negative plate capable of forming a uniform undried active material film on a current collector foil when a particle aggregate that contains granulated wet particles is consolidated between rolls, and an undried active material film is formed on current collector foil between the rolls to manufacture an electrode plate.

A first aspect of the disclosure relates to an electrode plate manufacturing apparatus consolidating a particle aggregate that contains active material particles, a binding agent, a solvent, and granulated wet particles and forming an undried active material film on a current collector foil when manufacturing an electrode plate having an active material layer that contains the active material particles and the binding agent on the current collector foil. The electrode plate manufacturing apparatus includes: a first roll; a second roll arranged in parallel with the first roll via a first gap, the second roll consolidating the particle aggregate between the first roll and the second roll and forming the undried active material film on the second roll; and a third roll arranged in parallel with the second roll via a second gap, the third roll transcribing the undried active material film, which is held on the second roll, onto the current collector foil between the second roll and the third roll while making the current collector foil pass between the second roll and the third roll. A circumferential velocity A of the first roll, a circumferential velocity B of the second roll, a conveyance velocity C of the current collector foil, a contact angle $\alpha$ between a first roll surface of the first roll and the solvent, a contact angle $\beta$ between a second roll surface of the second roll and the solvent, and a contact angle $\gamma$ between a foil surface of the current collector foil and the solvent satisfy the following conditions $\beta - \alpha \geq 1.6 \times B/A + 40$, where $\beta - \alpha > 0$ and $B/A \geq 1$; and $\gamma - \beta \geq -1.6 \times C/B + 40$, where $\gamma - \beta > 0$ and $C/B \geq 1$.

In the electrode plate manufacturing apparatus described above, the circumferential velocity A of the first roll, the circumferential velocity B of the second roll, the conveyance velocity C of the current collector foil, the contact angle α between the first roll surface of the first roll and the solvent (hereinafter also simply referred to as the "contact angle α of the first roll"), the contact angle β between the second roll surface of the second roll and the solvent (hereinafter also simply referred to as the "contact angle β of the second roll"), and the contact angle γ between the foil surface of the current collector foil and the solvent (hereinafter also simply referred to as the "contact angle γ of the current collector foil") satisfy the conditions $$\beta - \alpha \geq -1.6 \times B/A + 40, \text{ where } \beta - \alpha > 0 \text{ and } B/A \geq 1; \text{ and}$$

$$\gamma - \beta \geq -1.6 \times C/B + 40, \text{ where } \gamma - \beta > 0 \text{ and } C/B \geq 1.$$

In this way, when the particle aggregate is consolidated between the first roll and the second roll to form the undried active material film on the second roll, the uniform undried active material film with no defects such as lack of hiding and a streak can be formed. Furthermore, also when the undried active material film on the second roll is transcribed onto the current collector foil between the second roll and the third roll, the uniform undried active material film with no defects such as the lack of hiding and the streak can be formed.

A reason for the above is considered as follows. More specifically, when the contact angle α of the first roll is reduced, that is, when wettability of the first roll surface is increased, the solvent contained in the particle aggregate exudes, which facilitates wetting of the first roll surface with the solvent and also facilitates binding of wet particles due to a small amount of the solvent existing between the wet particles. Then, the wet particles are bonded and thus easily separate from the first roll (remaining of some of the wet particles on the first roll is prevented). Meanwhile, when the contact angle β of the second roll is increased, that is, when wettability of the second roll surface is reduced, the second roll surface is less likely to be wet by the solvent, and thus the particle aggregate is less likely to separate from the second roll. Accordingly, while the particle aggregate more easily separates from the first roll as the contact angle difference (β−α) between the contact angle β of the second roll and the contact angle α of the first roll is increased, it becomes more difficult for the particle aggregate to separate from the second roll. Thus, it is considered that the uniform undried active material film with no defects such as the lack of hiding and the streak can be formed on the second roll.

A relationship between the contact angle β of the second roll and the contact angle γ of the current collector foil can also be considered in a similar manner to the relationship between the contact angle α of the first roll and the contact angle β of the second roll. More specifically, while the undried active material film more easily separates from the second roll as the contact angle difference (γ−β) is increased, it becomes more difficult for the undried active material film to separate from the current collector foil. Thus, it is considered that the uniform undried active material film with no defects such as the lack of hiding and the streak can be formed on the current collector foil.

In addition, as the circumferential velocity B of the second roll is increased to be higher than the circumferential velocity A of the first roll, the undried active material film is easily formed on the second roll. Thus, a velocity ratio (B/A) of the circumferential velocity B of the second roll to the circumferential velocity A of the first roll may be increased. Similarly, as the conveyance velocity C of the current collector foil is increased to be higher than the circumferential velocity B of the second roll, the undried active material film is easily transcribed onto the current collector foil from the second roll. Thus, a velocity ratio (C/B) of the conveyance velocity C of the current collector foil to the circumferential velocity B of the second roll may be increased.

Furthermore, it has been found from a test result described below that the uniform undried active material film can be formed on the second roll when the contact angle difference (β−α) and the velocity ratio (B/A) satisfy the condition β−α≥−1.6×B/A+40. Moreover, it has been found that the uniform undried active material film can be formed on the current collector foil when the contact angle difference (γ−β) and the velocity ratio (C/B) satisfy the condition γ−β−1.6×C/B+40.

Note that the first roll surface of the first roll and the second roll surface of the second roll may each be formed of a rubber material such as urethane rubber, silicon rubber, or fluoro-rubber, a resin material such as a fluororesin or a silicon resin, an inorganic material such as alumina or silica, or a metal material such as stainless steel or chrome molybdenum steel.

In addition, as a method of regulating each value of the contact angle α of the first roll and the contact angle β of the second roll, for example, a method of reducing the value of the contact angle by executing plasma processing or corona processing of the roll surface, a method of regulating the value of the contact angle by changing surface roughness of the roll surface by polishing or the like, and a method of regulating the value of the contact angle by coating the roll surface with the fluororesin, the silicon resin, or the like are exemplified.

Note that the circumferential velocity A of the first roll may fall within a range from 1.0 to 50.0 m/min. The circumferential velocity B of the second roll may fall within a range from 1.0 to 80.0 m/min. The conveyance velocity C of the current collector foil may fall within a range from 1.0 to 100.0 m/min. The contact angle α of the first roll may fall within a range from 30 to 160° and may even further fall within a range from 20 to 120°. The contact angle β of the second roll may fall within a range from 30 to 160° and may even further fall within a range from 45 to 120°.

Furthermore, in the electrode plate manufacturing apparatus described above, the conveyance velocity C of the current collector foil may be from 8.0 to 100.0 m/min.

In the electrode plate manufacturing apparatus described above, even when the conveyance velocity C of the current collector foil is high, more specifically, even when the conveyance velocity C is from 8.0 to 100.0 m/min, the uniform undried active material film can be formed on the current collector foil by satisfying the two relational expressions described above. Thus, productivity of the electrode plate can be improved.

Furthermore, the electrode plate manufacturing apparatus according to any of the above may include: a first plasma generator that irradiates the first roll surface of the first roll with plasma to reduce a value of the contact angle α; and a second plasma generator that irradiates the second roll surface of the second roll with plasma to reduce a value of the contact angle β.

The electrode plate manufacturing apparatus described above includes the first plasma generator and the second plasma generator described above. In addition, when the first roll surface of the first roll is irradiated with plasma by the first plasma generator, dirt adhered to the first roll surface, such as an organic matter, can be removed. In this way, the contact angle α of the first roll can be reduced to easily obtain a desired value. Furthermore, when the second roll surface of the second roll is irradiated with plasma by the second plasma generator, the dirt adhered to the second roll surface, such as the organic matter, can be removed. In this way, the contact angle β of the second roll can be reduced to easily obtain a desired value.

A second aspect of the disclosure relates to a manufacturing method of a positive plate that has a positive active material layer containing positive active material particles and a binding agent on positive current collector foil. This manufacturing method includes: a consolidation process of consolidating a positive particle aggregate that contains the positive active material particles, the binding agent, a solvent, and granulated positive wet particles between a first roll and a second roll arranged in parallel with the first roll via a first gap and forming an undried positive film on the second roll; a transcription process of transcribing the undried positive film held on the second roll onto the positive current collector foil between the second roll and a third roll arranged in parallel with the second roll via a second gap while making the positive current collector foil pass between the second roll and the third roll after the consolidation process; and a drying process of drying the undried positive film on the positive current collector foil to form the positive active material layer after the transcription process. A solid fraction of the positive particle aggregate falls within a range from 71.0 to 80.0 wt %, and a circumferential velocity A of the first roll, a circumferential velocity B of the second roll, a conveyance velocity C of the positive current collector foil, a contact angle α between a first roll surface of the first roll and the solvent, a contact angle β between a second roll surface of the second roll and the solvent, and a contact angle γ between a foil surface of the positive current collector foil and the solvent satisfy the condition $\beta-\alpha \geq -1.6 \times B/A+40$ where $\beta-\alpha>0$ and $B/A \geq 1$ in the consolidation process, and satisfy the condition $\gamma-\beta \geq -1.6 \times C/B+40$ where $\gamma-\beta>0$ and $C/B \geq 1$ in the transcription process.

In the manufacturing method of the positive plate described above, the consolidation process is executed such that the condition $\beta-\alpha \geq -1.6 \times B/A+40$ where $\beta-\alpha>0$ and $B/A \geq 1$ is satisfied. In this way, the uniform undried positive film with no defects such as the lack of hiding and the streak can be formed on the second roll. Furthermore, the transcription process is executed such that the condition $\gamma-\beta-1.6 \times C/B+40$ where $\gamma-\beta>0$ and $C/B \geq 1$ is satisfied. In this way, the uniform undried positive film with no defects such as the lack of hiding and the streak can be formed on the positive current collector foil. Accordingly, the positive active material layer after the drying process can be the uniform active material layer with no defects such as the lack of hiding and the streak.

Furthermore, the conveyance velocity C of the positive current collector foil may be 8.0 to 100.0 m/min in the transcription process.

In the manufacturing method of the positive plate described above, even when the conveyance velocity C of the positive current collector foil is high, more specifically, even when the conveyance velocity C is from 8.0 to 100.0 m/min, the uniform undried positive film can be formed on the positive current collector foil by satisfying the two relational expressions described above. Therefore, productivity of the positive plate can be improved.

Moreover, in the manufacturing method of the positive plate according to any of the above, in the consolidation process and the transcription process, the first roll surface of the first roll may be irradiated with plasma to reduce a value of the contact angle α, and the second roll surface of the second roll may be irradiated with plasma to reduce a value of the contact angle β.

In the manufacturing method of the positive plate described above, the contact angle α of the first roll and the contact angle β of the second roll can be reduced when the first roll surface and the second roll surface are irradiated with plasma. Thus, the contact angles α, β can easily obtain desired values.

A third aspect of the disclosure relates to a manufacturing method of a negative plate that has a negative active material layer containing negative active material particles and a binding agent on a negative current collector foil. This manufacturing method includes: a consolidation process of consolidating a negative particle aggregate that contains the negative active material particles, the binding agent, a solvent, and granulated negative wet particles between a first roll and a second roll arranged in parallel with the first roll via a first gap and forming an undried negative film on the second roll; a transcription process of transcribing the undried negative film held on the second roll onto the negative current collector foil between the second roll and a third roll arranged in parallel with the second roll via a second gap while making the negative current collector foil pass between the second roll and the third roll after the consolidation process; and a drying process of drying the undried negative film on the negative current collector foil to form the negative active material layer after the transcription process. A solid fraction of the negative particle aggregate falls within a range from 66.0 to 80.0 wt %, and a circumferential velocity A of the first roll, a circumferential velocity B of the second roll, a conveyance velocity C of the negative current collector foil, a contact angle α between a first roll surface of the first roll and the solvent, a contact angle β between a second roll surface of the second roll and the solvent, and a contact angle γ between a foil surface of the negative current collector foil and the solvent satisfy the condition $\beta-\alpha \geq -1.6 \times B/A+40$ where $\beta-\alpha>0$ and $B/A \geq 1$ in the consolidation process, and satisfy the condition $\gamma-\beta 1.6 \times C/B+40$ where $\gamma-\beta>0$ and $C/B \geq 1$ in the transcription process.

In the manufacturing method of the negative plate described above, the consolidation process is executed such that the condition $\beta-\alpha \geq -1.6 \times B/A+40$ where $\beta-\alpha>0$ and $B/A \geq 1$ is satisfied. In this way, the uniform undried negative film with no defects such as the lack of hiding and the streak can be formed on the second roll. Furthermore, the transcription process is executed such that the condition $\gamma-\beta \geq -1.6 \times C/B+40$ where $\gamma-\beta>0$ and $C/B \geq 1$ is satisfied. In this way, the uniform undried negative film with no defects such as the lack of hiding and the streak can be formed on the negative current collector foil. Accordingly, the negative active material layer after the drying process can be the uniform active material layer with no defects such as the lack of hiding and the streak.

Furthermore, in the manufacturing method of the negative plate described above, the conveyance velocity C of the negative current collector foil may be 8.0 to 100.0 m/min in the transcription process.

In the manufacturing method of the negative plate described above, even when the conveyance velocity C of the negative current collector foil is high, more specifically, even when the conveyance velocity C is from 8.0 to 100.0 m/min, the uniform undried negative film can be formed on the negative current collector foil by satisfying the two relational expressions described above. Therefore, productivity of the negative plate can be improved.

Moreover, in the manufacturing method of the negative plate according to any of the above may be a manufacturing method of the negative plate in which, in the consolidation process and the transcription process, the first roll surface of the first roll may be irradiated with plasma to reduce a value of the contact angle α, and the second roll surface of the second roll may be irradiated with plasma to reduce a value of the contact angle β.

In the manufacturing method of the negative plate described above, the contact angle α of the first roll and the contact angle β of the second roll can be reduced when the first roll surface and the second roll surface are irradiated with plasma. Thus, the contact angles α, β can easily obtain desired values.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
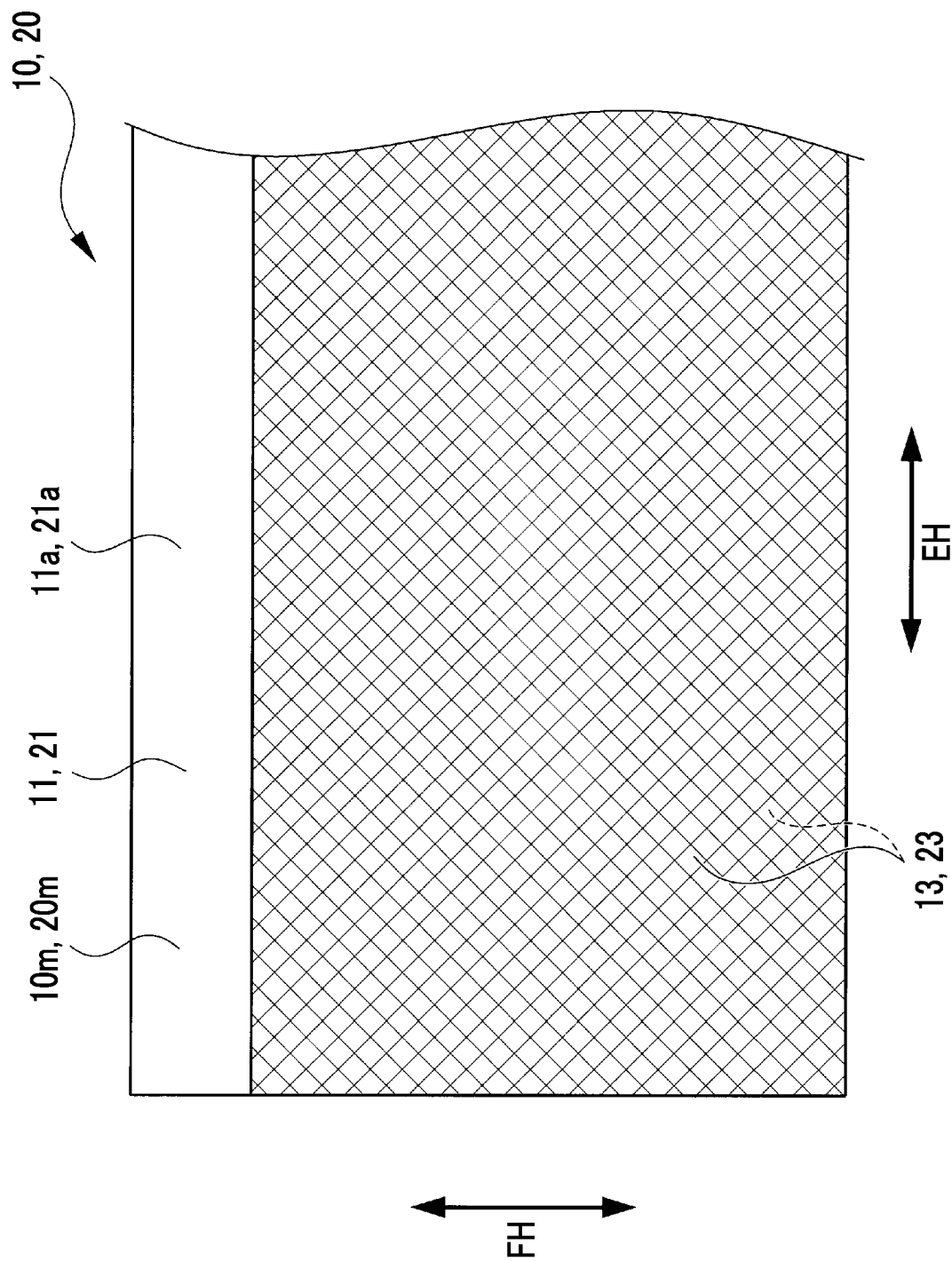
FIG. 1 is a plan view of a positive plate and a negative plate according to first and second embodiments.
Figure 2:
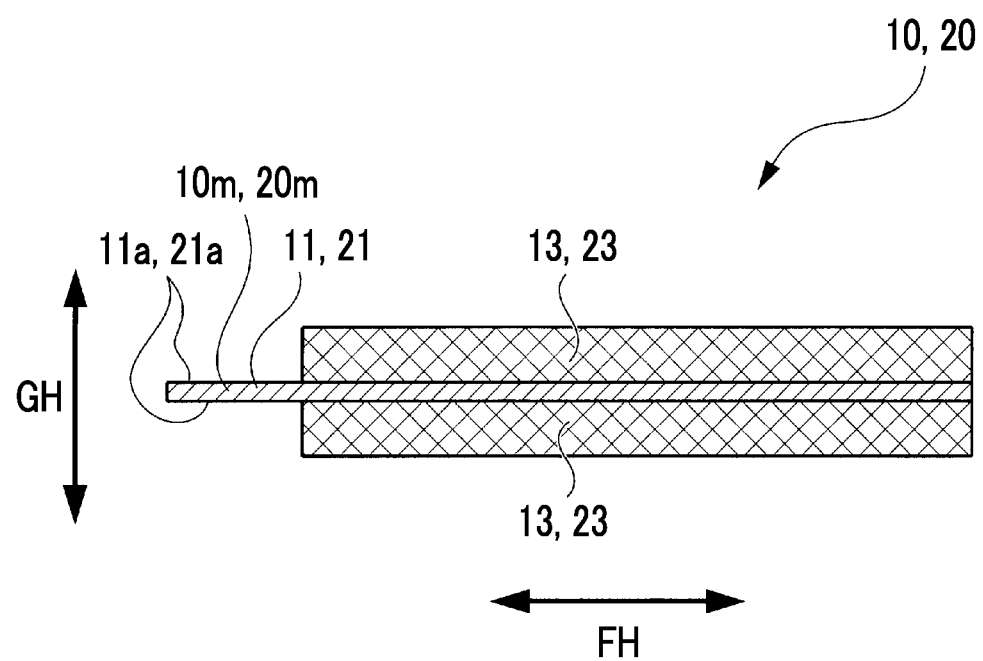
FIG. 2 is a cross-sectional view of the positive plate and the negative plate according to the first and second embodiments.

A description will hereinafter be made on a first embodiment of the disclosure with reference to the drawings. FIG. 1 and FIG. 2 are a plan view and a cross-sectional view of a positive plate (an electrode plate) 10 according to this first embodiment. This positive plate 10 is a belt-shaped positive plate used for a square sealed lithium-ion rechargeable battery. More specifically, this positive plate 10 and a belt-shaped negative plate 20 of a second embodiment, which will be described below, are stacked with each other via paired belt-shaped separators (not shown), are wound around an axis, and are compressed in a flat shape to constitute a flat wound electrode body (not shown). This electrode body is accommodated in a square battery case (not shown) to constitute the battery.

The positive plate 10 is provided with belt-shaped positive active material layers (active material layers) 13, 13 in a region that is a part of the positive plate 10 in a width direction FH and that extends in a longitudinal direction EH in foil surfaces 11a, 11a of positive current collector foil 11 formed of belt-shaped aluminum foil. At one end of the positive plate 10 in the width direction FH, the positive active material layer 13 does not exist in a thickness direction GH, and a positive exposed section 10m in which the positive current collector foil 11 is exposed in the thickness direction GH is formed. The positive active material layer 13 includes positive active material particles, conductive material particles, and a binding agent. In this first embodiment, lithium transition metal composite oxide particles, acetylene black (AB) particles, and polyvinylidene fluoride (PVDF) are respectively used as the positive active material particles, the conductive material particles, and the binding agent.

Figure 4:
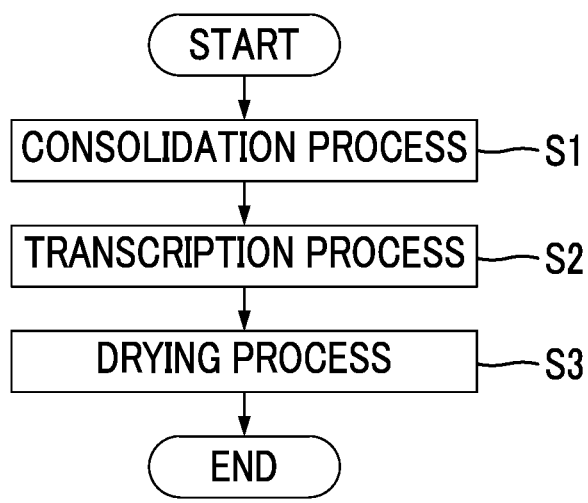
FIG. 4 is a flowchart of a manufacturing process of the positive plate and the negative plate according to the first and second embodiments.

Next, a manufacturing method of the above positive plate 10 will be described (see FIG. 4). First, a positive particle aggregate (a particle aggregate) 15 is prepared. This positive particle aggregate 15 contains the plural positive active material particles (the lithium transition metal composite oxide particles in this first embodiment), the plural conductive material particles (the AB particles in this first embodiment), the binding agent (the PVDF in this first embodiment), and a solvent (n-methyl-2-pyrrolidone (NMP) in this first embodiment). This positive particle aggregate 15 further contains positive wet particles in a wet state that are granulated in size of several tens μm to several mm as a particle diameter. In addition, a solid fraction NV of the positive particle aggregate 15 is 71.0 to 80.0 wt % (78.0 wt % in this first embodiment) (the ratio of NMP is 22.0 wt %).

This positive particle aggregate 15 is manufactured by the following method. More specifically, a stirring-type mixing/granulating device (not shown) capable of mixing and granulating a material is prepared. First, the conductive material particles (the AB particles) are put and mixed in this stirring-type mixing/granulating device, the positive active material particles (the lithium transition metal composite oxide particles) are added thereto, and the conductive material particles and the positive active material particles are dry-mixed. Then, a PVDF solution in which the binding agent (the PVDF) is dissolved in the solvent (the NMP) is added and mixed thereto, and a mixture is granulated. In this way, the positive particle aggregate 15 that contains the positive wet particles in the size of several tens μm to several mm as the particle diameter is obtained.

Figure 3:
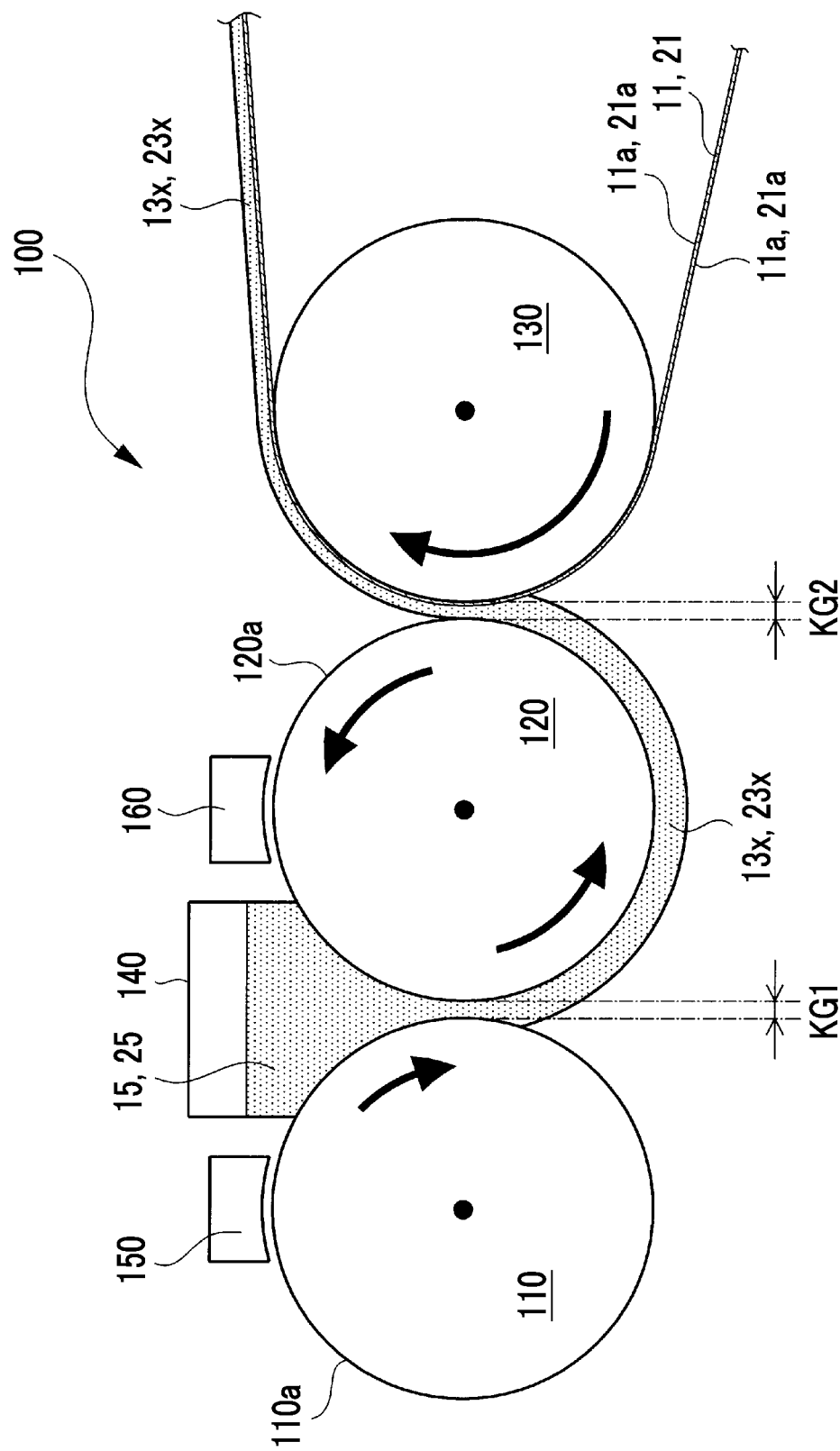
FIG. 3 is a view that illustrates an electrode plate manufacturing apparatus according to the first and second embodiments.

When the positive plate 10 is formed, the positive particle aggregate 15 is first consolidated in a consolidation process S1, and an undried positive film (an undried active material film) 13x is formed on the positive current collector foil 11 in the following transcription process S2. These consolidation process S1 and transcription process S2 are performed by using an electrode plate manufacturing apparatus 100 that is schematically shown in FIG. 3. This electrode plate manufacturing apparatus 100 has three rolls. More specifically, the electrode plate manufacturing apparatus 100 includes: a first roll 110, a first roll surface 110a of which is made of stainless steel; a second roll 120 that is arranged in parallel with this first roll 110 via a first gap KG1 and a second roll surface 120a of which is made of stainless steel; and a third roll 130 that is arranged in parallel with this second roll 120 via a second gap KG2.

A motor (not shown) that rotationally drives the roll is coupled to each of these first to third rolls 110, 120, and 130.

The electrode plate manufacturing apparatus 100 also includes a control section (not shown) that controls each of the motors. Furthermore, the electrode plate manufacturing apparatus 100 has a supply section 140 above the first gap KG1 between the first roll 110 and the second roll 120. The positive particle aggregate 15 described above is supplied to this supply section 140.

The electrode plate manufacturing apparatus 100 has a first plasma generator 150 and a second plasma generator 160. In this first embodiment, as each of these first and second plasma generators 150, 160, an atmospheric low-temperature plasma module (treatment gas: $CO_2/N_2$, a flow rate: 1.2 ml/min, and output: 1800 W) manufactured by AcXys Technologies was used. The first plasma generator 150 is installed above the first roll 110, and the first roll surface 110a of the first roll 110 can be irradiated with plasma. By this plasma irradiation, a value of a contact angle $\alpha$ between the first roll surface 110a and the solvent (the NMP) (hereinafter also simply referred to as a "contact angle $\alpha$ of the first roll 110") can be reduced. The second plasma generator 160 is installed above the second roll 120, and the second roll surface 120a of the second roll 120 can be irradiated with plasma. By this plasma irradiation, a value of a contact angle $\beta$ between the second roll surface 120a and the solvent (the NMP) (hereinafter also simply referred to as a "contact angle $\beta$ of the second roll 120") can be reduced. Note that a contact angle $\gamma$ between the foil surface 11a of the positive current collector foil 11, which is made of the aluminum foil and used in this first embodiment, and the solvent (the NMP) (hereinafter also simply referred to as the "contact angle $\gamma$ of the positive current collector foil 11") is 98.0°.

When the consolidation process S1 and the transcription process S2 are performed, the first to third rolls 110, 120, 130 in the electrode plate manufacturing apparatus 100 each rotate in a rotational direction indicated by an arrow in FIG. 3. That is, while the first roll 110 and the third roll 130 rotate in the same rotational direction (clockwise in this first embodiment), the second roll 120 rotates in a reverse direction (counterclockwise in this first embodiment) from these.

Note that a circumferential velocity B of the second roll 120 is equal to or higher than a circumferential velocity A of the first roll 110 (B/A≥1). In this first embodiment, the circumferential velocity B of the second roll 120 is set at 5.0 m/min, and the circumferential velocity A of the first roll 110 is set at 1.25 m/min (B/A=4.0). In addition, a circumferential velocity D of the third roll 130 is adjusted, and a conveyance velocity C of the positive current collector foil 11 is set to be equal to or higher than the circumferential velocity B of the second roll 120 (C/B≥1) and to be within a range of 8.0 to 100.0 m/min. In this first embodiment, the circumferential velocity D of the third roll 130 is set at 20.0 m/min, and the conveyance velocity C of the positive current collector foil 11 is set at 20.0 m/min (C/B=4.0).

The first plasma generator 150 is actuated, the first roll surface 110a of the first roll 110 is irradiated with plasma, and the contact angle $\alpha$ of the first roll 110 is set at 21.0°. In addition, the second plasma generator 160 is actuated, the second roll surface 120a of the second roll 120 is irradiated with plasma, and the contact angle $\beta$ of the second roll 120 is set at 59.6° that is larger than the contact angle $\alpha$ of the first roll 110 and is smaller than the contact angle $\gamma$ of the positive current collector foil 11 described above ($\gamma>\beta>\alpha$).

In this way, the circumferential velocity A of the first roll 110, the circumferential velocity B of the second roll 120, the conveyance velocity C of the positive current collector foil 11, the contact angle $\alpha$ of the first roll 110, the contact angle $\beta$ of the second roll 120, and the contact angle $\gamma$ of the positive current collector foil 11 satisfy the following two relational expressions.

$$(\beta-\alpha) \geq -1.6 \times (B/A) + 40 \quad (1)$$

$$(\gamma-\beta) \geq -1.6 \times (C/B) + 40 \quad (2)$$

Next, the positive particle aggregate 15 described above is supplied to the supply section 140 in the electrode plate manufacturing apparatus 100. In the consolidation process S1, this positive particle aggregate 15 is consolidated between the first roll 110 and the second roll 120, becomes an undried positive film 13x in a film shape, and is extruded downward in FIG. 3. Furthermore, this undried positive film 13x is held on the second roll surface 120a of the second roll 120 and is conveyed to the third roll 130 side.

Next, in the transcription process S2, while the positive current collector foil 11 passes between the second roll 120 and the third roll 130, the undried positive film 13x, which is held on the second roll surface 120a of the second roll 120, is transcribed onto the foil surface 11a of the positive current collector foil 11 between the second roll 120 and the third roll 130. Note that the belt-shaped positive current collector foil 11 is rolled out of a supply roll (not shown), is wound around the third roll 130, and thereby passes between the second roll 120 and the third roll 130.

The positive current collector foil 11, which is conveyed by the third roll 130, comes in contact with the undried positive film 13x, which is held on the second roll 120, between the second roll 120 and the third roll 130. Then, the undried positive film 13x is transcribed onto the foil surface 11a of the positive current collector foil 11 between the second roll 120 and the third roll 130. The undried positive film 13x and the positive current collector foil 11 after the transcription are conveyed to the right in FIG. 3 by the third roll 130.

Next, in a drying process S3, the undried positive film 13x on the positive current collector foil 11 is dried to form the positive active material layer 13. More specifically, the positive current collector foil 11, on which the undried positive film 13x is transcribed, is conveyed into a dryer (not shown), hot air is blown onto the undried positive film 13x, and the residual solvent (the NMP) in the undried positive film 13x is evaporated. In this way, the positive active material layer 13 is formed.

Next, the consolidation process S1, the transcription process S2, and the drying process S3 are similarly performed for the other foil surface 11a of the positive current collector foil 11 to form the positive active material layer 13. In this way, the positive plate 10 is formed.

As it has been described so far, in the electrode plate manufacturing apparatus 100 of this first embodiment, the circumferential velocity A of the first roll 110, the circumferential velocity B of the second roll 120, the conveyance velocity C of the positive current collector foil 11, the contact angle $\alpha$ of the first roll 110, the contact angle $\beta$ of the second roll 120, and the contact angle $\gamma$ of the positive current collector foil 11 satisfy the relationships of $(\beta-\alpha) \geq -1.6 \times (B/A) + 40$ (wherein $\beta-\alpha>0$ and B/A≥1) and $(\gamma-\beta) \geq -1.6 \times (C/B) + 40$ (wherein $\gamma-\beta>0$ and C/B≥1). In this way, when the positive particle aggregate 15 is consolidated between the first roll 110 and the second roll 120 and the undried positive film 13x is formed on the second roll 120 in the consolidation process S1, the uniform undried positive film 13x with no defects such as lack of hiding and a streak can be formed. Furthermore, when the undried positive film 13x on the second roll 120 is transcribed onto the positive current collector foil 11 between the second roll 120 and the third roll 130 in the transcription process S2, the uniform undried positive film 13x with no defects such as the lack of hiding and the streak can be formed. Accordingly, the positive active material layer 13 after the drying process S3 can be a uniform active material layer with no defects such as the lack of hiding and the streak.

Furthermore, in this first embodiment, the conveyance velocity C of the positive current collector foil 11 is set at 8.0 to 100.0 m/min (specifically, 20.0 m/min). As described above, even when the conveyance velocity C of the positive current collector foil 11 is high, the uniform undried positive film 13x can be formed on the positive current collector foil 11 by satisfying the two relational expressions (1), (2) described above, and thus productivity of the positive plate 10 can be improved. In addition, in this first embodiment, because the electrode plate manufacturing apparatus 100 includes the first plasma generator 150 and the second plasma generator 160, the contact angle α of the first roll 110 and the contact angle β of the second roll 120 can be reduced to easily obtain desired values.

Second Embodiment

Next, a description will be made on a second embodiment. In the first embodiment, the description has been made on the positive plate 10 that is used for the lithium-ion rechargeable battery and the manufacturing method thereof. Meanwhile, in this second embodiment, a description will be made on the negative plate (the electrode plate) 20 that is used for the lithium-ion rechargeable battery and a manufacturing method thereof (see FIG. 1 to FIG. 4).

The negative plate 20 in this second embodiment is provided with belt-shaped negative active material layers (the active material layers) 23, 23 in a region that is a part of the negative plate 20 in the width direction FH and that extends in the longitudinal direction EH in foil surfaces 21a, 21a of negative current collector foil (current collector foil) 21 formed of belt-shaped copper foil. At one end of the negative plate 20 in the width direction FH, the negative active material layer 23 does not exist in the thickness direction GH, and a negative exposed section 20m in which the negative current collector foil 21 is exposed in the thickness direction GH is formed. The negative active material layer 23 includes negative active material particles and the binding agent. In this second embodiment, graphite particles and carboxymethyl cellulose (CMC) are respectively used as the negative active material particles and the binding agent.

Next, the manufacturing method of the above negative plate 20 will be described (see FIG. 4). First, a negative particle aggregate (a particle aggregate) 25 is prepared. This negative particle aggregate 25 contains the plural negative active material particles (the graphite particles), the binding agent (CMC), and a solvent (water in this second embodiment). This negative particle aggregate 25 further contains negative wet particles in the wet state that are granulated in size of several tens μm to several mm as the particle diameter. In addition, the solid fraction NV of the negative particle aggregate 25 is 66.0 to 80.0 wt % (72.0 wt % in this second embodiment) (a fraction of water is 28.0 wt %).

This negative particle aggregate 25 is manufactured by the following method. More specifically, a stirring-type mixing/granulating device (not shown) that is similar to the one in the above first embodiment is prepared. First, the negative active material particles (the graphite particles) are put and mixed in this stirring-type mixing/granulating device, the binding agent (CMC) is added thereto, and the negative active material particles and the binding agent are dry-mixed. Thereafter, the solvent (water) is added and mixed therewith, and a mixture is granulated. In this way, the negative particle aggregate 25 that contains the negative wet particles in the size of several tens μm to several mm as the particle diameter is obtained.

The negative plate 20 is manufactured in a similar manner to the positive plate 10 in the first embodiment. That is, the electrode plate manufacturing apparatus 100 shown in FIG. 3 is used, the negative particle aggregate 25 is consolidated in the consolidation process S1, and then an undried negative film (an undried active material film) 23x is formed on the negative current collector foil 21 in the transcription process S2. More specifically, the circumferential velocity B of the second roll 120 is equal to or higher than the circumferential velocity A of the first roll 110 (B/A≥1). In this second embodiment, the circumferential velocity B of the second roll 120 is set at 5.0 m/min, and the circumferential velocity A of the first roll 110 is set at 1.25 m/min (B/A=4.0). In addition, the circumferential velocity D of the third roll 130 is adjusted, and the conveyance velocity C of the negative current collector foil 21 is set to be equal to or higher than the circumferential velocity B of the second roll 120 (C/B≥1) and to be within the range of 8.0 to 100.0 m/min. In this second embodiment, the circumferential velocity D of the third roll 130 is set at 20.0 m/min, and the conveyance velocity C of the negative current collector foil 21 is set at 20.0 m/min (C/B=4.0).

The first plasma generator 150 is actuated, the first roll surface 110a of the first roll 110 is irradiated with plasma, and the contact angle α of the first roll 110 is set at 23.0°. In addition, the second plasma generator 160 is actuated, the second roll surface 120a of the second roll 120 is irradiated with plasma, and the contact angle β of the second roll 120 is set at 59.0° that is larger than the contact angle α of the first roll 110 and is smaller than the contact angle γ of the negative current collector foil 21 described above (γ>β>α). Note that the contact angle γ between the foil surface 21a of the negative current collector foil 21, which is made of the copper foil and used in this second embodiment, and the solvent (water) is 97.6°.

In this way, also in this second embodiment, the circumferential velocity A of the first roll 110, the circumferential velocity B of the second roll 120, the conveyance velocity C of the negative current collector foil 21, the contact angle α of the first roll 110, the contact angle β of the second roll 120, and the contact angle γ of the negative current collector foil 21 satisfy the two relational expressions described above.

$$(\beta-\alpha) \geq -1.6 \times (B/A) + 40 \tag{1}$$

$$(\gamma-\beta) \geq -1.6 \times (C/B) + 40 \tag{2}$$

Next, the negative particle aggregate 25 described above is supplied to the supply section 140 in the electrode plate manufacturing apparatus 100. In the consolidation process S1, this negative particle aggregate 25 is consolidated between the first roll 110 and the second roll 120, becomes the undried negative film 23x, and is held on the second roll surface 120a of the second roll 120. Next, in the transcription process S2, while the negative current collector foil 21 passes between the second roll 120 and the third roll 130, the undried negative film 23x, which is held on the second roll surface 120a of the second roll 120, is transcribed onto the foil surface 21a of the negative current collector foil 21 between the second roll 120 and the third roll 130.

Thereafter, in the drying process S3, similar to the first embodiment, the undried negative film 23x on the negative current collector foil 21 is dried to form the negative active material layer 23. Next, the consolidation process S1, the transcription process S2, and the drying process S3 are similarly performed for the other foil surface 21a of the negative current collector foil 21 to form the negative active material layer 23. In this way, the negative plate 20 is formed.

As it has been described so far, the electrode plate manufacturing apparatus 100 of this second embodiment satisfies the relationships of $(\beta-\alpha) \geq -1.6 \times (B/A) + 40$ (wherein $\beta-\alpha > 0$ and $B/A \geq 1$) and $(\gamma-\beta) \geq -1.6 \times (C/B) + 40$ (wherein $\gamma-\beta > 0$ and $C/B \geq 1$). In this way, when the negative particle aggregate 25 is consolidated between the first roll 110 and the second roll 120 and the undried negative film 23x is formed on the second roll 120 in the consolidation process S1, the uniform undried negative film 23x with no defects such as the lack of hiding and the streak can be formed. Furthermore, when the undried negative film 23x on the second roll 120 is transcribed onto the negative current collector foil 21 between the second roll 120 and the third roll 130 in the transcription process S2, the undried negative film 23x with no defects such as the lack of hiding and the streak can be formed. Accordingly, the negative active material layer 23 after the drying process S3 can be the uniform active material layer with no defects such as the lack of hiding and the streak.

Furthermore, in this second embodiment, the conveyance velocity C of the negative current collector foil 21 is set at 8.0 to 100.0 m/min (specifically, 20.0 m/min). As described above, even when the conveyance velocity C of the negative current collector foil 21 is high, the uniform undried negative film 23x can be formed on the negative current collector foil 21 by satisfying the two relational expressions (1), (2) described above, and thus productivity of the negative plate 20 can be improved. In addition, in this second embodiment, because the electrode plate manufacturing apparatus 100 includes the first plasma generator 150 and the second plasma generator 160, the contact angle α of the first roll 110 and the contact angle β of the second roll 120 can be reduced to easily obtain the desired values.

(Examples and Comparative Examples Related to Manufacturing of Positive Plate) Next, a description will be made on results of tests that were performed to verify effects of the disclosure. As Examples 1 to 11 and Comparative Examples 1 to 3, the circumferential velocity A of the first roll 110, the circumferential velocity B of the second roll 120, a contact angle difference (β−α) between the contact angle β of the second roll 120 and the contact angle α of the first roll 110, and the solid fraction NV of the positive particle aggregate 15 were each changed as shown in Table 1, and the consolidation process S1 related to manufacturing of the positive plate 10 in the first embodiment was executed by using the electrode plate manufacturing apparatus 100 described above.

TABLE 1

|  | Circumferential velocity A (m/min) | Circumferential velocity B (m/min) | Velocity ratio B/A | Contact angle difference (β − α) (°) | Solid fraction NV (wt %) | Film formability |
| --- | --- | --- | --- | --- | --- | --- |
| Example 1 | 20.0 | 20.0 | 1 | 43.5 | 78.0 | ○ |
| Example 2 | 10.0 | 20.0 | 2 | 42.0 | 78.0 | ○ |
| Example 3 | 5.0 | 20.0 | 4 | 38.4 | 78.0 | ○ |
| Example 4 | 3.3 | 20.0 | 6 | 36.4 | 78.0 | ○ |
| Example 5 | 2.5 | 20.0 | 8 | 32.7 | 78.0 | ○ |
| Example 6 | 1.7 | 20.0 | 12 | 25.9 | 78.0 | ○ |
| Example 7 | 1.0 | 20.0 | 20 | 13.2 | 78.0 | ○ |
| Example 8 | 2.0 | 40.0 | 20 | 13.2 | 78.0 | ○ |
| Example 9 | 3.0 | 60.0 | 20 | 13.2 | 78.0 | ○ |
| Example 10 | 2.5 | 20.0 | 8 | 42.0 | 78.0 | ○ |
| Example 11 | 5.0 | 100.0 | 20 | 13.2 | 72.0 | ○ |
| Comparative Example 1 | 1.0 | 20.0 | 20 | 13.2 | 70.0 | X |
| Comparative Example 2 | 5.0 | 20.0 | 4 | 29.5 | 78.0 | X |
| Comparative Example 3 | 2.5 | 20.0 | 8 | 19.0 | 78.0 | X |

Figure 5:
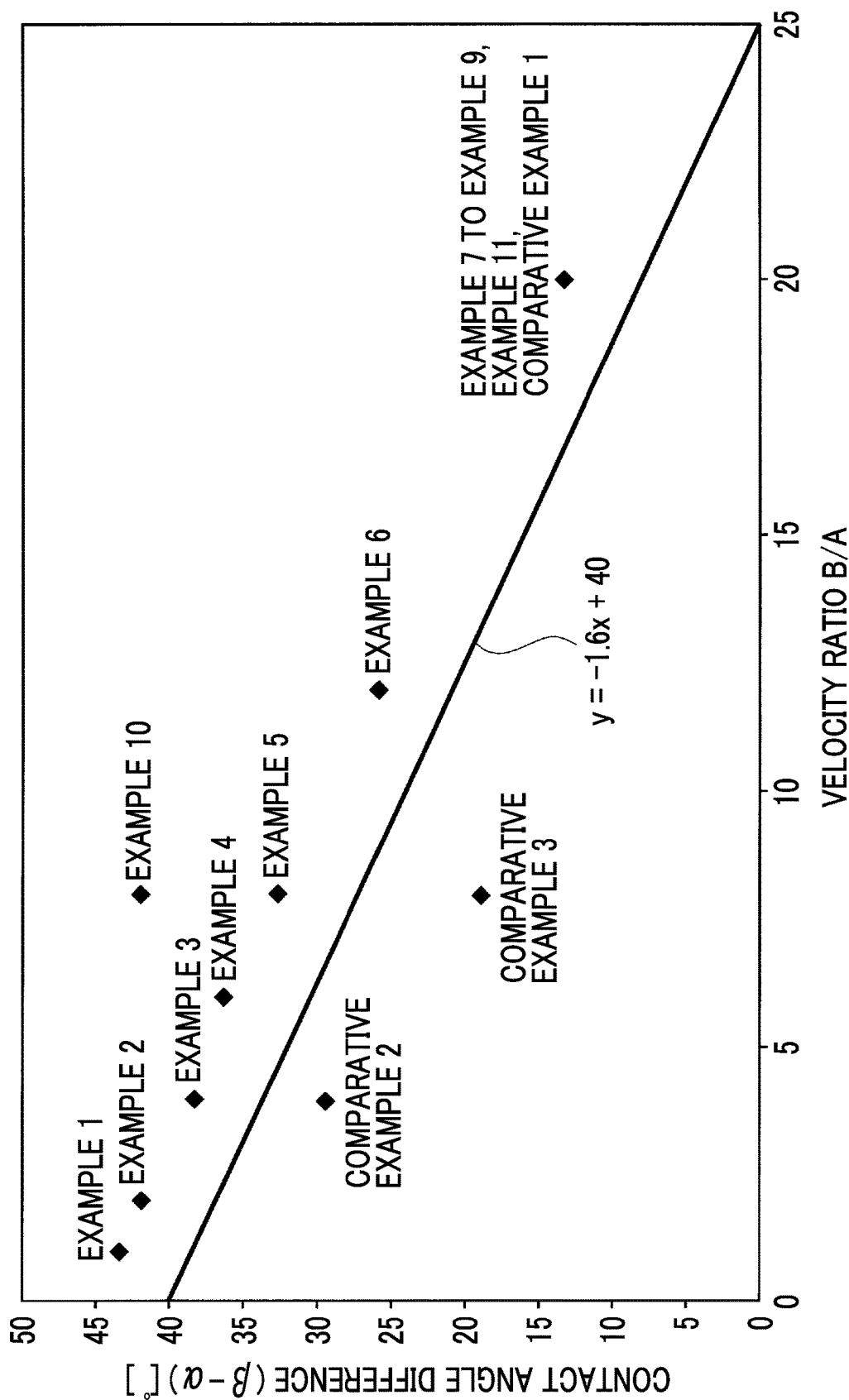
FIG. 5 is a graph of a relationship between a velocity ratio B/A and a contact angle difference (β−α) according to Examples and Comparative Examples of the positive plate.

Then, for each of Examples 1 to 11 and Comparative Examples 1 to 3, a state of the undried positive film 13x, which was formed on the second roll surface 120a of the second roll 120 in the consolidation process S1, was visually evaluated. More specifically, the undried positive film 13x with the defect such as the lack of hiding or the streak was evaluated such that the film formability thereof was poor "x", the undried positive film 13x without the defect such as the lack of hiding or the streak was evaluated such that the film formability thereof was good "0". The result is shown in Table 1. In addition, for each of Examples 1 to 11 and Comparative Examples 1 to 3, a relationship between the velocity ratio B/A and the contact angle difference (β−α) is shown in FIG. 5. Here, the velocity ratio B/A is a ratio of the circumferential velocity B of the second roll 120 to the circumferential velocity A of the first roll 110, and the contact angle difference (β−α) is a difference between the contact angle β of the second roll 120 and the contact angle α of the first roll 110.

As it is apparent from Table 1, in the consolidation process S1 of each of Comparative Examples 1 to 3, the defects such as the lack of hiding and the streak occurred to the undried positive film 13x formed on the second roll 120, and thus the film formability thereof was poor. Meanwhile, in the consolidation process S1 of each of Examples 1 to 11, the defects such as the lack of hiding and the streak did not occur to the undried positive film 13x formed on the second roll 120, and thus the film formability thereof was good. A reason for the above is considered as follows.

More specifically, it is considered that the solid fraction NV of the positive particle aggregate 15 as 70.0 wt % was too low and thus the film formability was poor in the consolidation process S1 of Comparative Example 1. The reason therefor is as follows. When a large amount of the solvent (NMP) was contained in the positive particle aggregate 15, the large amount of the NMP existed between the positive particle aggregate 15 and the first roll surface 110a of the first roll 110 in the consolidation process S1. Due to the existence of this NMP, adhesion of the positive particle aggregate 15 to the first roll 110 was increased. In this way, it became difficult to separate the positive particle aggregate 15 from the first roll 110 and to transcribe the positive particle aggregate 15 onto the second roll 120. Thus, it is considered that the film formability in the second roll 120 was poor.

In addition, in Comparative Examples 2, 3, the contact angle difference ($\beta-\alpha$) was too small with respect to the velocity ratio B/A. More specifically, as a boundary is shown in a linear graph (y=−1.6x+40) of FIG. 5, a relationship of ($\beta-\alpha$)<1.6×(B/A)+40 was established in Comparative Examples 2, 3. Thus, it is considered that the film formability was poor. Meanwhile, in the consolidation process S1 of each of Examples 1 to 11, the solid fraction NV of the positive particle aggregate 15 was equal to or higher than 71.0 wt %, and the contact angle difference ($\beta-\alpha$) was too large with respect to the velocity ratio B/A. More specifically, a relationship of ($\beta-\alpha$)≥−1.6×(B/A)+40 was satisfied. Thus, it is considered that the film formability was good.

More specifically, when the contact angle $\alpha$ of the first roll 110 is reduced, that is, when wettability of the first roll surface 110a is increased, the solvent (the NMP) contained in the positive particle aggregate 15 exudes, which facilitates wetting of this first roll surface 110a with the NMP. Consequently, the amount of the NMP that exists between the positive particle aggregate 15 and the first roll surface 110a is reduced, and the adhesion of the positive particle aggregate 15 to the first roll surface 110a is reduced. Thus, the positive particle aggregate 15 easily separates from the first roll 110. Meanwhile, when the contact angle $\beta$ of the second roll 120 is increased, that is, when the wettability of the second roll surface 120a is reduced, this second roll surface 120a is less likely to be wet by the NMP. In this way, the large amount of the NMP exists between the positive particle aggregate 15 and the second roll surface 120a, and the adhesion of the positive particle aggregate 15 to the second roll surface 120a is increased. Thus, it becomes difficult for the positive particle aggregate 15 to separate from the second roll 120. Accordingly, while the positive particle aggregate 15 more easily separates from the first roll 110 as the contact angle difference ($\beta-\alpha$) between the contact angle $\beta$ of the second roll 120 and the contact angle $\alpha$ of the first roll 110 is increased, it becomes more difficult for the positive particle aggregate 15 to separate from the second roll 120. Thus, it is considered that the uniform undried positive film 13x can be formed on the second roll 120.

In addition, as the circumferential velocity B of the second roll 120 is increased to be higher than the circumferential velocity A of the first roll 110, the undried positive film 13x can easily be formed not on the first roll 110 but on the second roll 120. Thus, it is considered to be preferable to increase the velocity ratio (B/A) between the circumferential velocity B of the second roll 120 and the circumferential velocity A of the first roll 110. In addition, in regard to making the film formability good, the velocity ratio B/A and the contact angle difference ($\beta-\alpha$) relate to each other. Thus, when the velocity ratio B/A is relatively large (located on a right side in FIG. 5), the film formability can be good even with the small contact angle difference ($\beta-\alpha$). Meanwhile, when the velocity ratio B/A is relatively small (located on a left side in FIG. 5), the contact angle difference ($\beta-\alpha$) has to be increased, and the formation of the undried positive film 13x on the second roll 120 is thereby facilitated by the contact angle difference ($\beta-\alpha$). Otherwise, it is considered that the film formation of the undried positive film 13x less likely becomes good.

Furthermore, in addition to the above-described test result, it has been found that, when the contact angle $\beta$ of the second roll 120 is set to be equal to or smaller than the contact angle $\alpha$ of the first roll 110 ($\beta-\alpha \leq 0$), the film formability in the consolidation process S1 worsens. Thus, the contact angle difference ($\beta-\alpha$) preferably satisfies $\beta-\alpha>0$. It has also been found that the film formability in the consolidation process S1 worsens when the circumferential velocity B of the second roll 120 is set to be lower than the circumferential velocity A of the first roll 110 (B/A<1). Thus, the velocity ratio (B/A) is preferably set to satisfy B/A≥1. In addition, when the solid fraction NV of the positive particle aggregate 15 exceeds 80.0 wt %, formation (granulation) of the positive wet particles itself becomes difficult. Thus, the solid fraction NV of the positive particle aggregate 15 is preferably set at 80.0 wt % or lower.

It has been found from the test result described so far that the uniform undried positive film 13x can be formed on the second roll 120 in the consolidation process S1 when the solid fraction NV of the positive particle aggregate 15 is set at 71.0 to 80.0 wt %, and ($\beta-\alpha$)≥−1.6×(B/A)+40 (wherein $\beta-\alpha>0$ and B/A≥1) is satisfied. It has also been found that the film formability in the consolidation process S1 can be good even when the circumferential velocity B of the second roll 120 is set to be fast from 8.0 to 100.0 m/min.

Next, as Examples 12 to 22 and Comparative Examples 4 to 6, the circumferential velocity B of the second roll 120, the conveyance velocity C of the positive current collector foil 11, a contact angle difference ($\gamma-\beta$) between the contact angle $\gamma$ of the positive current collector foil 11 and the contact angle $\beta$ of the second roll 120, and the solid fraction NV of the positive particle aggregate 15 were each changed as shown in Table 2, and the consolidation process S1 and the transcription process S2 related to manufacturing of the positive plate 10 in the first embodiment were executed by using the electrode plate manufacturing apparatus 100 described above.

Note that, in these Examples 12 to 22 and Comparative Examples 4 to 6, the circumferential velocity A of the first roll 110 is set to satisfy the velocity ratio B/A=1 with respect to the circumferential velocity B of the second roll 120. In addition, the contact angle $\alpha$ of the first roll 110 is set to satisfy the contact angle difference ($\alpha-\beta$)=43.5(°) with respect to the contact angle $\beta$ of the second roll 120. Accordingly, because the relationship between the first roll 110 and the second roll 120 satisfies ($\beta-\alpha$)≥−1.6×(B/A)+40 (wherein $\beta-\alpha>0$ and B/A≥1), the uniform undried positive film 13x can be formed on the second roll 120 in the consolidation process S1.

TABLE 2

|  | Circumferential velocity B (m/min) | Conveyance velocity C (m/min) | Velocity ratio C/B | Contact angle difference (γ − β) (°) | Solid fraction NV (wt %) | Film formability |
|---|---|---|---|---|---|---|
| Example 12 | 20.0 | 20.0 | 1 | 43.5 | 78.0 | ○ |
| Example 13 | 10.0 | 20.0 | 2 | 42.0 | 78.0 | ○ |
| Example 14 | 5.0 | 20.0 | 4 | 38.4 | 78.0 | ○ |
| Example 15 | 3.3 | 20.0 | 6 | 36.4 | 78.0 | ○ |
| Example 16 | 2.5 | 20.0 | 8 | 32.7 | 78.0 | ○ |
| Example 17 | 1.7 | 20.0 | 12 | 25.9 | 78.0 | ○ |
| Example 18 | 1.0 | 20.0 | 20 | 13.2 | 78.0 | ○ |
| Example 19 | 2.0 | 40.0 | 20 | 13.2 | 78.0 | ○ |
| Example 20 | 3.0 | 60.0 | 20 | 13.2 | 78.0 | ○ |
| Example 21 | 2.5 | 20.0 | 8 | 42.0 | 78.0 | ○ |
| Example 22 | 5.0 | 100.0 | 20 | 13.2 | 72.0 | ○ |
| Comparative Example 4 | 1.0 | 20.0 | 20 | 13.2 | 70.0 | X |
| Comparative Example 5 | 5.0 | 20.0 | 4 | 29.5 | 78.0 | X |
| Comparative Example 6 | 2.5 | 20.0 | 8 | 19.0 | 78.0 | X |

Figure 6:
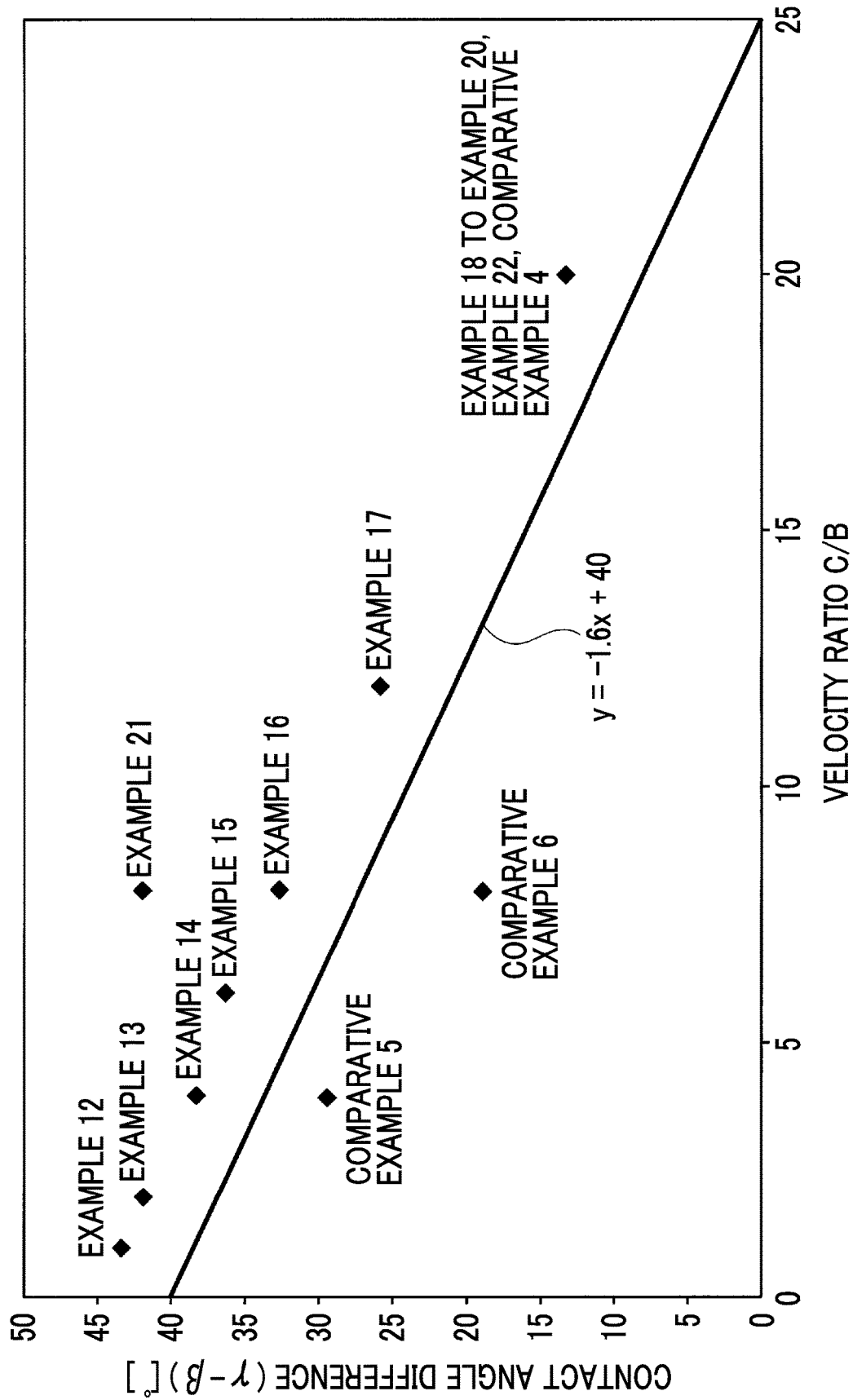
FIG. 6 is a graph of a relationship between a velocity ratio C/B and a contact angle difference (γ−β) according to Examples and Comparative Examples of the positive plate.

Then, for each of Examples 12 to 22 and Comparative Examples 4 to 6, the state of the undried positive film 13x, which was formed on the foil surface 11a of the positive current collector foil 11 in the transcription process S2, was visually evaluated as described above. The result is shown in Table 2. In addition, for each of Examples 12 to 22 and Comparative Examples 4 to 6, a relationship between the velocity ratio C/B and the contact angle difference (γ−β) is shown in FIG. 6. Here, the velocity ratio C/B is a ratio of the conveyance velocity C of the positive current collector foil 11 to the circumferential velocity B of the second roll 120, and the contact angle difference (γ−β) is a difference between the contact angle γ of the positive current collector foil 11 and the contact angle β of the second roll 120.

As it is apparent from Table 2, in Comparative Examples 4 to 6, the defects such as the lack of hiding and the streak occurred to the undried positive film 13x formed on the positive current collector foil 11 in the transcription process S2, and thus the film formability thereof was poor. Meanwhile, in Examples 12 to 22, the defects such as the lack of hiding and the streak did not occur to the undried positive film 13x formed on the positive current collector foil 11 in the transcription process S2, and thus the film formability thereof was good. A reason for the above is considered as follows.

That is, it is considered that the solid fraction NV of the positive particle aggregate 15 as 70.0 wt % was too low in the transcription process S2 of Comparative Example 4 and thus the film formability was poor as in the case of the consolidation process S1 of Comparative Example 1 described above. In addition, in Comparative Examples 5, 6, the contact angle difference (γ−β) was too small with respect to the velocity ratio C/B. More specifically, as a boundary is shown in a linear graph (y=1.6x+40) of FIG. 6, a relationship of (γ−β)<−1.6×(C/B)+40 was established in Comparative Examples 5, 6. Thus, it is considered that the film formability was poor. Meanwhile, in the transcription process S2 of each of Examples 12 to 22, the solid fraction NV of the positive particle aggregate 15 was equal to or higher than 71.0 wt %, and the contact angle difference (γ−β) was too large with respect to the velocity ratio C/B. More specifically, a relationship of (γ−β)≥−1.6×(C/B)+40 was satisfied. Thus, it is considered that the film formability was good.

Furthermore, in addition to the above-described test result, it has been found that, when the contact angle γ of the positive current collector foil 11 is set to be equal to or smaller than the contact angle β of the second roll 120 (γ−β≤0), the film formability in the transcription process S2 worsens. Thus, the contact angle difference (γ−β) preferably satisfies γ−β>0. It has also been found that the film formability in the transcription process S2 worsens when the conveyance velocity C of the positive current collector foil 11 is set to be lower than circumferential velocity B of the second roll 120 (C/B<1). Thus, the velocity ratio (C/B) is preferably set to satisfy C/B≥1. In addition, when the solid fraction NV of the positive particle aggregate 15 exceeds 80.0 wt % as described above, the formation (the granulation) of the positive wet particles itself becomes difficult. Thus, the solid fraction NV of the positive particle aggregate 15 is preferably set at 80.0 wt % or lower.

Next, as Comparative Examples 7, 8, the velocity ratio B/A between the circumferential velocity B of the second roll 120 and the circumferential velocity A of the first roll 110, the velocity ratio C/B between the conveyance velocity C of the positive current collector foil 11 and the circumferential velocity B of the second roll 120, the contact angle difference (β−α) between the contact angle β of the second roll 120 and the contact angle α of the first roll 110, the contact angle difference (γ−β) between the contact angle γ of the positive current collector foil 11 and the contact angle β of the second roll 120, and the solid fraction NV of the positive particle aggregate 15 were each changed as shown in Table 3, and the consolidation process S1 and the transcription process S2 related to manufacturing of the positive plate 10 in the first embodiment were executed by using the electrode plate manufacturing apparatus 100 described above. Note that, in these Comparative Examples 7, 8, the circumferential velocity A of the first roll 110, the circumferential velocity B of the second roll 120, and the conveyance velocity C of the positive current collector foil 11 were respectively set at 5.0 m/min, 10.0 m/min, and 20.0 m/min.

TABLE 3

|  | Velocity ratio B/A | Velocity ratio C/B | Contact angle difference ($\beta - \alpha$) (°) | Contact angle difference ($\gamma - \beta$) (°) | Solid fraction NV (wt %) | Film formability |
|---|---|---|---|---|---|---|
| Comparative Example 7 | 2 | 2 | 43.4 | 20.0 | 72.0 | X |
| Comparative Example 8 | 2 | 2 | 20.0 | 40.0 | 72.0 | X |

Then, for each of Comparative Examples 7, 8, the state of the undried positive film 13x, which was formed on the second roll surface 120a of the second roll 120 in the consolidation process S1, was visually evaluated. In addition, the state of the undried positive film 13x, which was formed on the foil surface 11a of the positive current collector foil 11 in the transcription process S2, was visually evaluated. As a result, in Comparative Example 7, the film formability of the undried positive film 13x, which was formed on the second roll 120 in the consolidation process S1, was good; however, the film formability of the undried positive film 13x, which was formed on the positive current collector foil 11 in the transcription process S2, was poor (the evaluation "x" in Table 3). Meanwhile, in Comparative Example 8, the film formability of the undried positive film 13x, which was formed on the second roll 120 in the consolidation process S1, was poor, and the film formability of the undried positive film 13x, which was formed on the positive current collector foil 11 in the transcription process S2, was also poor (the evaluation "x" in Table 3).

A reason for the above is considered as follows. More specifically, in Comparative Example 7, the solid fraction NV of the positive particle aggregate 15 was equal to or higher than 71.0 wt %, and the contact angle difference ($\beta-\alpha$) was too large with respect to the velocity ratio B/A. More specifically, the relationship of ($\beta-\alpha$)≥−1.6×(B/A)+40 was satisfied. Thus, it is considered that the film formability in the consolidation process S1 was good. However, in this Comparative Example 7, similar to Comparative Examples 5, 6 described above, the contact angle difference ($\gamma-\beta$) was too small with respect to the velocity ratio C/B. More specifically, the relationship of ($\gamma-\beta$)≥−1.6×(C/B)+40 was not satisfied. Thus, it is considered that the film formability in the transcription process S2 was poor.

Meanwhile, in this Comparative Example 8, the solid fraction NV of the positive particle aggregate 15 was equal to or higher than 71.0 wt %. However, similar to Comparative Examples 2, 3 described above, the contact angle difference ($\beta-\alpha$) was too small with respect to the velocity ratio B/A. More specifically, the relationship of ($\beta-\alpha$)≥−1.6×(B/A)+40 was not satisfied. Thus, it is considered that the film formability in the consolidation process S1 was poor. In addition, in this Comparative Example 8, the contact angle difference ($\gamma-\beta$) was large with respect to the velocity ratio C/B, and the relationship of ($\gamma-\beta$)≥−1.6×(C/B)+40 was satisfied in the transcription process S2. However, the film formability of the undried positive film 13x, which was formed on the second roll 120 in the consolidation process S1, was poor. Thus, it is considered that the film formability of the undried positive film 13x, which was formed on the positive current collector foil 11 from this undried positive film 13x in the transcription process S2, was poor.

It has been found from the test result described so far that the uniform undried positive film 13x can be formed on the positive current collector foil 11 during manufacturing of the positive plate 10 by executing the consolidation process S1 such that the solid fraction NV of the positive particle aggregate 15 is set at 71.0% to 80.0 wt % and ($\beta-\alpha$)≥−1.6×(B/A)+40 (wherein $\beta-\alpha>0$ and B/A≥1) is satisfied as described above and by further executing the transcription process S2 such that ($\gamma-\beta$)≥−1.6×(C/B)+40 (wherein $\gamma-\beta>0$ and C/B≥1) is satisfied. It has also been found that the film formability in the transcription process S2 can be good even when the conveyance velocity C of the positive current collector foil 11 is set to be fast from 8.0 to 100.0 m/min.

(Examples and Comparative Examples Related to Manufacturing of Negative Plate) Next, as Examples 31 to 42 and Comparative Examples 31 to 33, the circumferential velocity A of the first roll 110, the circumferential velocity B of the second roll 120, the contact angle difference ($\beta-\alpha$) between the contact angle $\beta$ of the second roll 120 and the contact angle $\alpha$ of the first roll 110, and the solid fraction NV of the negative particle aggregate 25 were each changed as shown in Table 4, and the consolidation process S1 related to manufacturing of the negative plate 20 in the second embodiment was executed by using the electrode plate manufacturing apparatus 100 described above.

TABLE 4

|  | Circumferential velocity A (m/min) | Circumferential velocity B (m/min) | Velocity ratio B/A | Contact angle difference ($\beta - \alpha$) (°) | Solid fraction NV (wt %) | Film formability |
|---|---|---|---|---|---|---|
| Example 31 | 20.0 | 20.0 | 1 | 43.4 | 72.0 | ○ |
| Example 32 | 10.0 | 20.0 | 2 | 41.8 | 72.0 | ○ |
| Example 33 | 5.0 | 20.0 | 4 | 38.6 | 72.0 | ○ |
| Example 34 | 3.3 | 20.0 | 6 | 35.4 | 72.0 | ○ |
| Example 35 | 2.5 | 20.0 | 8 | 32.2 | 72.0 | ○ |
| Example 36 | 1.7 | 20.0 | 12 | 25.8 | 72.0 | ○ |
| Example 37 | 1.0 | 20.0 | 20 | 13.0 | 72.0 | ○ |
| Example 38 | 2.0 | 40.0 | 20 | 13.0 | 72.0 | ○ |
| Example 39 | 3.0 | 60.0 | 20 | 13.0 | 72.0 | ○ |

TABLE 4-continued

|  | Circumferential velocity A (m/min) | Circumferential velocity B (m/min) | Velocity ratio B/A | Contact angle difference (β − α) (°) | Solid fraction NV (wt %) | Film formability |
| --- | --- | --- | --- | --- | --- | --- |
| Example 40 | 2.5 | 20.0 | 8 | 40.0 | 72.0 | ○ |
| Example 41 | 5.0 | 100.0 | 20 | 13.0 | 72.0 | ○ |
| Example 42 | 10.0 | 20.0 | 2 | 43.4 | 67.0 | ○ |
| Comparative Example 31 | 1.0 | 20.0 | 20 | 13.0 | 65.0 | X |
| Comparative Example 32 | 5.0 | 20.0 | 4 | 30.0 | 72.0 | X |
| Comparative Example 33 | 2.5 | 20.0 | 8 | 20.0 | 72.0 | X |

Figure 7:
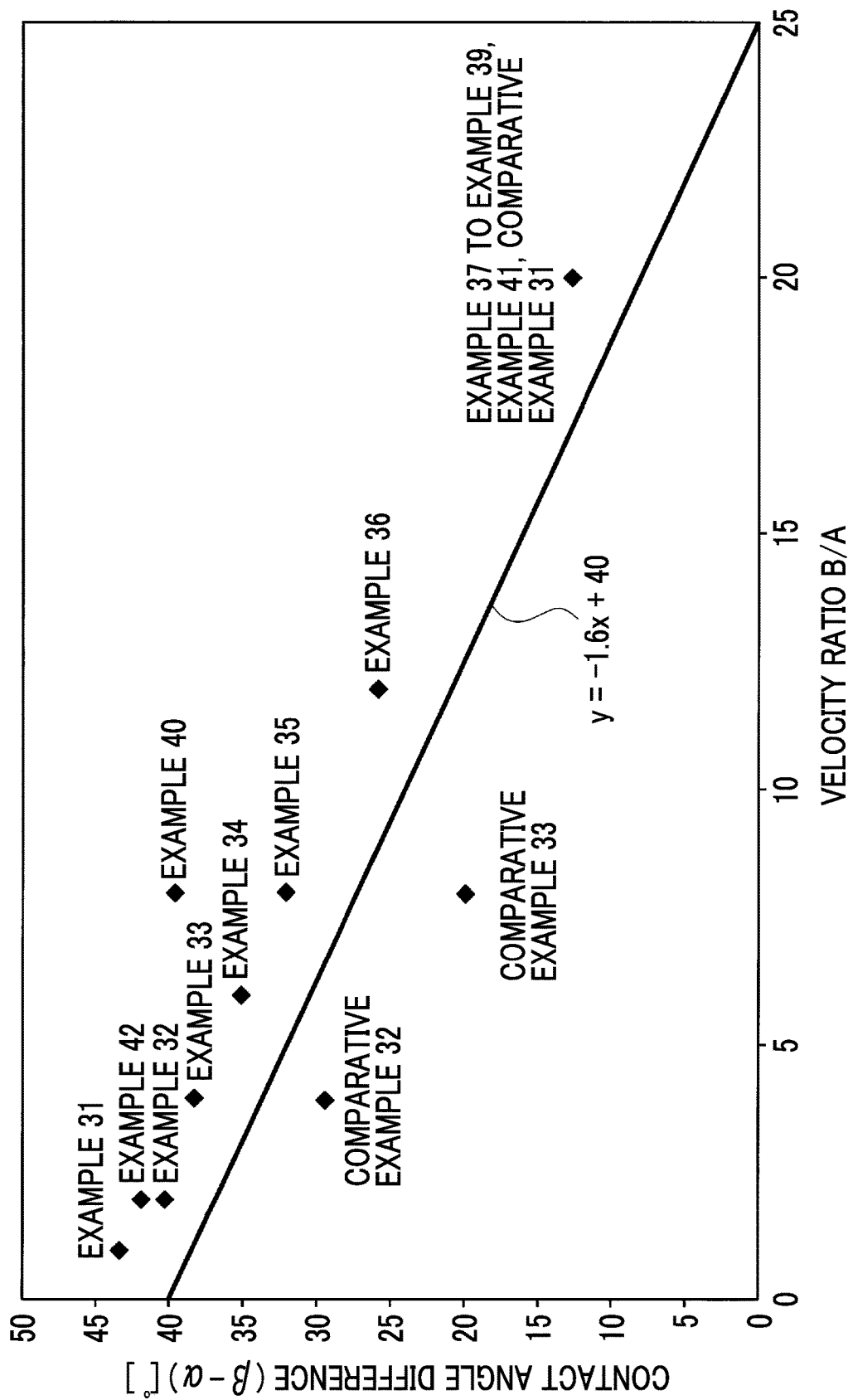
FIG. 7 is a graph of a relationship between the velocity ratio B/A and the contact angle difference (β−α) according to Examples and Comparative Examples of the negative plate.

Then, for each of Examples 31 to 42 and Comparative Examples 31 to 33, the state of the undried negative film 23x, which was formed on the second roll surface 120a of the second roll 120 in the consolidation process S1, was visually evaluated as described above. The result is shown in Table 4. In addition, for each of Examples 31 to 42 and Comparative Examples 31 to 33, the relationship between the velocity ratio B/A and the contact angle difference (β−α) is shown in FIG. 7. Here, the velocity ratio B/A is the ratio of the circumferential velocity B of the second roll 120 to the circumferential velocity A of the first roll 110, and the contact angle difference (β−α) is the difference between the contact angle β of the second roll 120 and the contact angle α of the first roll 110.

As it is apparent from Table 4, in the consolidation process S1 of each of Comparative Examples 31 to 33, the defects such as the lack of hiding and the streak occurred to the undried negative film 23x formed on the second roll 120, and thus the film formability thereof was poor. Meanwhile, in the consolidation process S1 of each of Examples 31 to 42, the defects such as the lack of hiding and the streak did not occur to the undried negative film 23x formed on the second roll 120, and thus the film formability thereof was good. A reason for the above is considered as follows.

That is, it is considered that the solid fraction NV of the negative particle aggregate 25 as 65.0 wt % was too low in the consolidation process S1 of Comparative Example 31 and thus the film formability was poor as in the case of the consolidation process S1 of Comparative Examples 1, 4 for manufacturing of the positive plate 10 described above. In addition, in Comparative Examples 32, 33, the contact angle difference (β−α) was too small with respect to the velocity ratio B/A. More specifically, as the boundary is shown in the linear graph (y=−1.6x+40) of FIG. 7, the relationship of (β−α)<−1.6×(B/A)+40 was established in Comparative Examples 32, 33. Thus, it is considered that the film formability was poor. Meanwhile, in the consolidation process S1 of each of Examples 31 to 42, the solid fraction NV of the negative particle aggregate 25 was equal to or higher than 66.0 wt %, and the contact angle difference (β−α) was too large with respect to the velocity ratio B/A. More specifically, the relationship of (β−α)≥−1.6×(B/A)+40 was satisfied. Thus, it is considered that the film formability was good.

Furthermore, in addition to the above-described test result, it has been found that, when the contact angle β of the second roll 120 is set to be equal to or smaller than the contact angle α of the first roll 110 (β−α≤0), the film formability in the consolidation process S1 worsens. Thus, the contact angle difference (β−α) preferably satisfies β−α>0. It has also been found that the film formability in the consolidation process S1 worsens when the circumferential velocity B of the second roll 120 is set to be lower than the circumferential velocity A of the first roll 110 (B/A<1). Thus, the velocity ratio (B/A) is preferably set to satisfy B/A≥1. In addition, when the solid fraction NV of the negative particle aggregate 25 exceeds 80.0 wt %, the formation (the granulation) of the negative wet particles itself becomes difficult. Thus, the solid fraction NV of the negative particle aggregate 25 is preferably set at 80.0 wt % or lower.

It has been found from the test result described so far that the uniform undried negative film 23x can be formed on the second roll 120 in the consolidation process S1 when the solid fraction NV of the negative particle aggregate 25 is set at 66.0 to 80.0 wt %, and (β−α)≥−1.6×(B/A)+40 (wherein β−α>0 and B/A≥1) is satisfied. It has also been found that the film formability in the consolidation process S1 can be good even when the circumferential velocity B of the second roll 120 is set to be fast from 8.0 to 100.0 m/min.

Next, as Examples 43 to 54 and Comparative Examples 34 to 36, the circumferential velocity B of the second roll 120, the conveyance velocity C of the negative current collector foil 21, the contact angle difference (γ−β) between the contact angle γ of the negative current collector foil 21 and the contact angle β of the second roll 120, and the solid fraction NV of the negative particle aggregate 25 were each changed as shown in Table 5, and the consolidation process S1 and the transcription process S2 related to manufacturing of the negative plate 20 in the second embodiment were executed by using the electrode plate manufacturing apparatus 100 described above.

Note that, in these Examples 43 to 54 and Comparative Examples 34 to 36, the circumferential velocity A of the first roll 110 is set to satisfy the velocity ratio B/A=1 with respect to the circumferential velocity B of the second roll 120. In addition, the contact angle α of the first roll 110 is set to satisfy the contact angle difference (α−β)=43.5(°) with respect to the contact angle β of the second roll 120. Accordingly, because the relationship between the first roll 110 and the second roll 120 satisfies (β−α)≥−1.6×(B/A)+40 (wherein β−α>0 and B/A≥1), the uniform undried negative film 23x can be formed on the second roll 120 in the consolidation process S1.

TABLE 5

| | Circumferential velocity B (m/min) | Conveyance velocity C (m/min) | Velocity ratio C/B | Contact angle difference (γ − β) (°) | Solid fraction NV (wt %) | Film formability |
|---|---|---|---|---|---|---|
| Example 43 | 20.0 | 20.0 | 1 | 43.4 | 72.0 | ○ |
| Example 44 | 10.0 | 20.0 | 2 | 41.8 | 72.0 | ○ |
| Example 45 | 5.0 | 20.0 | 4 | 38.6 | 72.0 | ○ |
| Example 46 | 3.3 | 20.0 | 6 | 35.4 | 72.0 | ○ |
| Example 47 | 2.5 | 20.0 | 8 | 32.2 | 72.0 | ○ |
| Example 48 | 1.7 | 20.0 | 12 | 25.8 | 72.0 | ○ |
| Example 49 | 1.0 | 20.0 | 20 | 13.0 | 72.0 | ○ |
| Example 50 | 2.0 | 40.0 | 20 | 13.0 | 72.0 | ○ |
| Example 51 | 3.0 | 60.0 | 20 | 13.0 | 72.0 | ○ |
| Example 52 | 2.5 | 20.0 | 8 | 40.0 | 72.0 | ○ |
| Example 53 | 5.0 | 100.0 | 20 | 13.0 | 72.0 | ○ |
| Example 54 | 10.0 | 20.0 | 2 | 40.0 | 67.0 | ○ |
| Comparative Example 34 | 1.0 | 20.0 | 20 | 13.0 | 65.0 | X |
| Comparative Example 35 | 5.0 | 20.0 | 4 | 30.0 | 72.0 | X |
| Comparative Example 36 | 2.5 | 20.0 | 8 | 20.0 | 72.0 | X |

Figure 8:
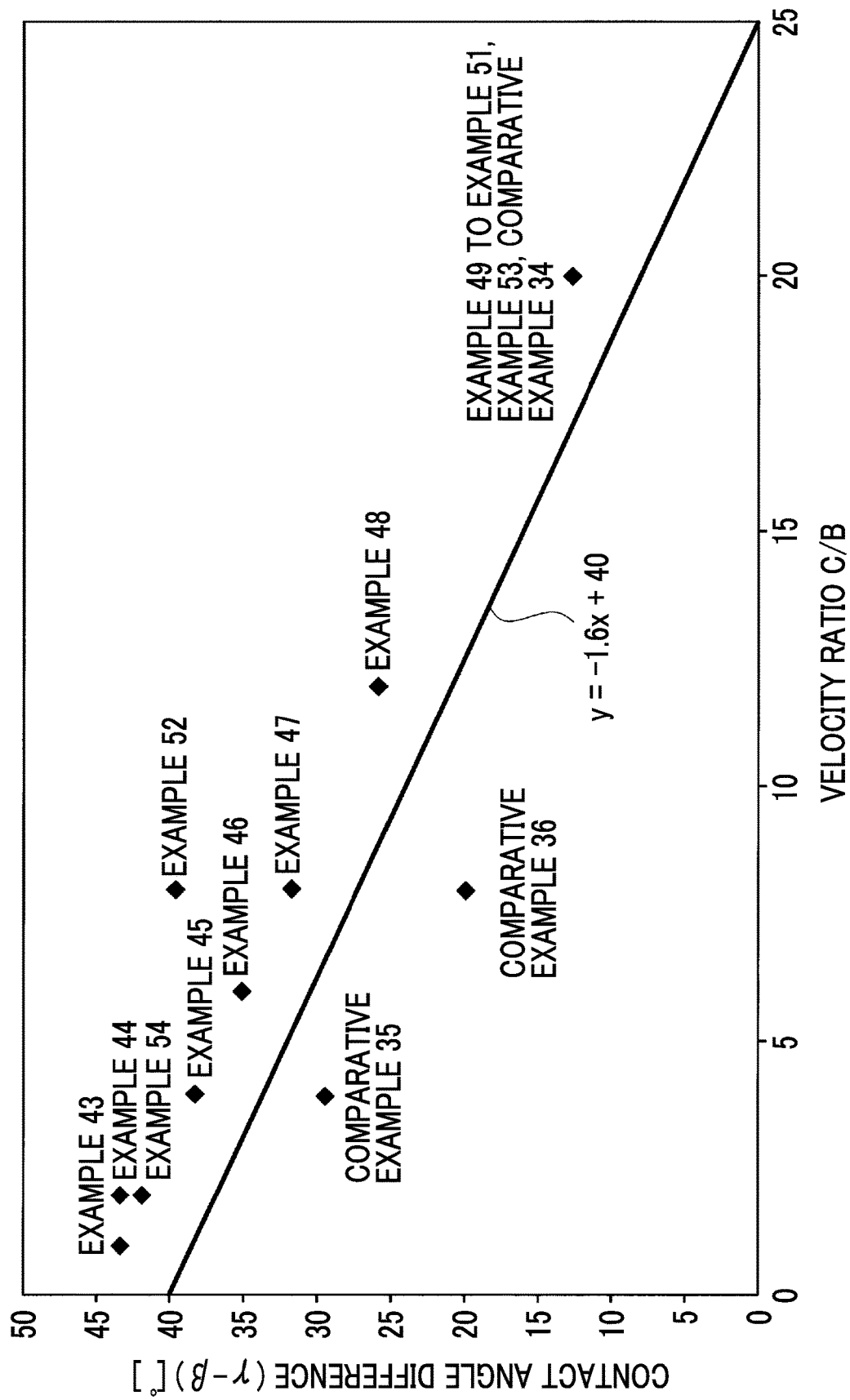
FIG. 8 is a graph of a relationship between the velocity ratio C/B and the contact angle difference (γ−β) according to Examples and Comparative Examples of the negative plate.

Then, for each of Examples 43 to 54 and Comparative Examples 34 to 36, a state of the undried negative film 23x, which was formed on the foil surface 21a of the negative current collector foil 21 in the transcription process S2, was visually evaluated as described above. The result is shown in Table 5. In addition, for each of Examples 43 to 54 and Comparative Examples 34 to 36, the relationship between the velocity ratio C/B and the contact angle difference (γ−β) is shown in FIG. 8. Here, the velocity ratio C/B is a ratio of the conveyance velocity C of the negative current collector foil 21 to the circumferential velocity B of the second roll 120, and the contact angle difference (γ−β) is a difference between the contact angle γ of the negative current collector foil 21 and the contact angle β of the second roll 120.

As it is apparent from Table 5, in Comparative Examples 34 to 36, the defects such as the lack of hiding and the streak occurred to the undried negative film 23x formed on the negative current collector foil 21 in the transcription process S2, and thus the film formability thereof was poor. Meanwhile, in Examples 43 to 54, the defects such as the lack of hiding and the streak did not occur to the undried negative film 23x formed on the negative current collector foil 21 in the transcription process S2, and thus the film formability thereof was good. A reason for the above is considered as follows.

That is, it is considered that the solid fraction NV of the negative particle aggregate 25 as 65.0 wt % was too low in the transcription process S2 of Comparative Example 34 and thus the film formability was poor as in the case of the consolidation process S1 of Comparative Example 31. In addition, in Comparative Examples 35, 36, the contact angle difference (γ−β) was too small with respect to the velocity ratio C/B. More specifically, as the boundary is shown in the linear graph (y=−1.6x+40) of FIG. 8, the relationship of (γ−β)<−1.6×(C/B)+40 was established in Comparative Examples 35, 36. Thus, it is considered that the film formability was poor. Meanwhile, in the transcription process S2 of each of Examples 43 to 54, the solid fraction NV of the negative particle aggregate 25 was equal to or higher than 66.0 wt %, and the contact angle difference (γ−β) was too large with respect to the velocity ratio C/B. More specifically, a relationship of (γ−β)≥−1.6×(C/B)+40 was satisfied. Thus, it is considered that the film formability was good.

Furthermore, in addition to the above-described test result, it has been found that, when the contact angle γ of the negative current collector foil 21 is set to be equal to or smaller than the contact angle β of the second roll 120 (γ−β≤0), the film formability in the transcription process S2 worsens. Thus, the contact angle difference (γ−β) preferably satisfies γ−β>0. It has also been found that the film formability in the transcription process S2 worsens when the conveyance velocity C of the negative current collector foil 21 is set to be lower than circumferential velocity B of the second roll 120 (C/B<1). Thus, the velocity ratio (C/B) is preferably set to satisfy C/B≥1. In addition, when the solid fraction NV of the negative particle aggregate 25 exceeds 80.0 wt % as described above, the formation (the granulation) of the negative wet particles itself becomes difficult. Thus, the solid fraction NV of the negative particle aggregate 25 is preferably set at 80.0 wt % or lower.

It has been found from the test result described so far that the uniform undried negative film 23x can be formed on the negative current collector foil 21 during manufacturing of the negative plate 20 by executing the consolidation process S1 such that the solid fraction NV of the negative particle aggregate 25 is set at 66.0 to 80.0 wt % and (β−α)≥−1.6×(B/A)+40 (wherein β−α>0 and B/A≥1) is satisfied as described above and by further executing the transcription process S2 such that (γ−β)≥−1.6×(C/B)+40 (wherein γ−β>0 and C/B≥1) is satisfied. It has also been found that the film formability in the transcription process S2 can be good even when the conveyance velocity C of the negative current collector foil 21 is set to be fast from 8.0 to 100.0 m/min.

The description has been made so far on the disclosure according to the first and second embodiments. However, the disclosure is not limited to the first and second embodiments described above, and it is thus needless to say that the disclosure can appropriately be modified for application within the scope that does not depart from the gist thereof.

What is claimed is:
1. An electrode plate manufacturing apparatus consolidating a particle aggregate that contains active material particles, a binding agent, a solvent, and granulated wet particles and forming an undried active material film on a current collector foil when manufacturing an electrode plate having an active material layer that contains the active material particles, and the binding agent, on the current collector foil, the electrode plate manufacturing apparatus comprising:
- a first roll;
- a second roll arranged in parallel with the first roll via a first gap, the second roll consolidating the particle aggregate between the first roll and the second roll and forming the undried active material film on the second roll; and
- a third roll arranged in parallel with the second roll via a second gap, the third roll transcribing the undried active material film, which is held on the second roll, onto the current collector foil between the second roll and the third roll while making the current collector foil pass between the second roll and the third roll, wherein
- a circumferential velocity A of the first roll, a circumferential velocity B of the second roll, a conveyance velocity C of the current collector foil, a contact angle $\alpha$ between a first roll surface of the first roll and the solvent, a contact angle $\beta$ between a second roll surface of the second roll and the solvent, and a contact angle $\gamma$ between a foil surface of the current collector foil and the solvent satisfy conditions:

$\beta-\alpha \geq -1.6 \times B/A + 40$ where $\beta-\alpha > 0$ and $B/A \geq 1$; and $\gamma-\beta \geq -1.6 \times C/B + 40$ where $\gamma-\beta > 0$ and $C/B \geq 1$.

2. The electrode plate manufacturing apparatus according to claim 1, wherein
the conveyance velocity C of the current collector foil is 8.0 to 100.0 m/min.

3. The electrode plate manufacturing apparatus according to claim 1, further comprising:
- a first plasma generator that irradiates the first roll surface of the first roll with plasma to reduce a value of the contact angle $\alpha$; and
- a second plasma generator that irradiates the second roll surface of the second roll with plasma to reduce a value of the contact angle $\beta$.

4. A manufacturing method of a positive plate that has a positive active material layer containing positive active material particles and a binding agent on positive current collector foil, the manufacturing method comprising:
- a consolidation process of consolidating a positive particle aggregate that contains the positive active material particles, the binding agent, a solvent, and granulated positive wet particles between a first roll and a second roll arranged in parallel with the first roll via a first gap and forming an undried positive film on the second roll;
- a transcription process of transcribing the undried positive film held on the second roll onto the positive current collector foil between the second roll and a third roll arranged in parallel with the second roll via a second gap while making the positive current collector foil pass between the second roll and the third roll after the consolidation process; and
- a drying process of drying the undried positive film on the positive current collector foil to form the positive active material layer after the transcription process, wherein
- a solid fraction of the positive particle aggregate falls within a range from 71.0 to 80.0 wt %, and
- a circumferential velocity A of the first roll, a circumferential velocity B of the second roll, a conveyance velocity C of the positive current collector foil, a contact angle $\alpha$ between a first roll surface of the first roll and the solvent, a contact angle $\beta$ between a second roll surface of the second roll and the solvent, and a contact angle $\gamma$ between a foil surface of the positive current collector foil and the solvent satisfy a first condition $\beta-\alpha \geq -1.6 \times B/A + 40$ where $\beta-\alpha > 0$ and $B/A \geq 1$ in the consolidation process, and satisfy a second condition $\gamma-\beta \geq -1.6 \times C/B + 40$ where $\gamma-\beta > 0$ and $C/B \geq 1$ in the transcription process.

5. The manufacturing method of the positive plate according to claim 4, wherein
the conveyance velocity C of the positive current collector foil is 8.0 to 100.0 m/min in the transcription process.

6. The manufacturing method of the positive plate according to claim 4, wherein
in the consolidation process and the transcription process, the first roll surface of the first roll is irradiated with plasma to reduce a value of the contact angle $\alpha$, and
the second roll surface of the second roll is irradiated with plasma to reduce a value of the contact angle $\beta$.

7. A manufacturing method of a negative plate that has a negative active material layer containing negative active material particles and a binding agent on a negative current collector foil, the manufacturing method comprising:
- a consolidation process of consolidating a negative particle aggregate that contains the negative active material particles, the binding agent, a solvent, and granulated negative wet particles between a first roll and a second roll arranged in parallel with the first roll via a first gap and forming an undried negative film on the second roll;
- a transcription process of transcribing the undried negative film held on the second roll onto the negative current collector foil between the second roll and a third roll arranged in parallel with the second roll via a second gap while making the negative current collector foil pass between the second roll and the third roll after the consolidation process; and
- a drying process of drying the undried negative film on the negative current collector foil to form the negative active material layer after the transcription process, wherein
- a solid fraction of the negative particle aggregate falls within a range from 66.0 to 80.0 wt %, and a circumferential velocity A of the first roll, a circumferential velocity B of the second roll, a conveyance velocity C of the negative current collector foil, a contact angle $\alpha$ between a first roll surface of the first roll and the solvent, a contact angle $\beta$ between a second roll surface of the second roll and the solvent, and a contact angle $\gamma$ between a foil surface of the negative current collector foil and the solvent satisfy a first condition $\beta-\alpha \geq -1.6 \times B/A + 40$ where $\beta-\alpha > 0$ and $B/A \geq 1$ in the consolidation process, and
satisfy a second condition $\gamma-\beta \geq -1.6 \times C/B + 40$ where $\gamma-\beta > 0$ and $C/B \geq 1$ in the transcription process.

8. The manufacturing method of the negative plate according to claim 7, wherein
the conveyance velocity C of the negative current collector foil is 8.0 to 100.0 m/min in the transcription process.

9. The manufacturing method of the negative plate according to claim 7, wherein
in the consolidation process and the transcription process, the first roll surface of the first roll is irradiated with plasma to reduce a value of the contact angle $\alpha$, and
the second roll surface of the second roll is irradiated with plasma to reduce a value of the contact angle $\beta$.

* * * * *